United States Patent [19]

Tanji et al.

[11] Patent Number: 5,661,793
[45] Date of Patent: Aug. 26, 1997

[54] KEY UNIT

[75] Inventors: Junichi Tanji; Fumiyoshi Oono; Takuya Ishida; Toshimi Akimoto, all of Koriyama; Tomonobu Watanabe, Tamura-gun; Katutoshi Yoshida, Koriyama; Ichiro Hoshi, Koriyama; Tatsuo Yamauchi, Koriyama; Junichiro Imai, Koriyama, all of Japan

[73] Assignee: Hitachi Telecom Technologies, Ltd., Koriyama, Japan

[21] Appl. No.: 526,420

[22] Filed: Sep. 11, 1995

Related U.S. Application Data

[63] Continuation-in-part of Ser. No. 151,780, Nov. 15, 1993, abandoned, which is a continuation of Ser. No. 655,293, Feb. 14, 1991, abandoned.

[30] Foreign Application Priority Data

| Feb. 15, 1990 | [JP] | Japan | 2-32454 |
| Feb. 15, 1990 | [JP] | Japan | 2-32455 |
| Feb. 15, 1990 | [JP] | Japan | 2-32456 |
| Jun. 27, 1990 | [JP] | Japan | 2-166834 |
| Jun. 27, 1990 | [JP] | Japan | 2-166835 |

[51] Int. Cl.$^6$ ............................................. H04M 1/00
[52] U.S. Cl. ................................ 379/368; 379/428; 379/429
[58] Field of Search .......................... 379/368, 369, 379/428, 429, 267, 308, 436; 700/5 A, 512, 517, 600, 313, 314, 317; 361/398, 380, 412; 345/168, 170

[56] References Cited

U.S. PATENT DOCUMENTS

| 3,035,211 | 5/1962 | Mitchell | 379/368 |
| 3,696,908 | 10/1972 | Gluck et al. | 379/368 |
| 3,797,630 | 3/1974 | Zilkha | 379/368 |
| 4,191,871 | 3/1980 | Coyle | 200/317 |
| 4,243,846 | 1/1981 | Lenaerts et al. | 341/22 |
| 4,348,122 | 9/1982 | Balta et al. | 241/22 |
| 4,710,597 | 12/1987 | Loheac | 200/314 |
| 4,897,651 | 1/1990 | DeMonte | 341/22 |
| 4,920,342 | 4/1990 | Gratke | 200/600 |
| 4,977,317 | 12/1990 | Iwashima | 250/239 |
| 4,989,240 | 1/1991 | Fuse | 379/368 |
| 5,039,832 | 8/1991 | Polacek et al. | 200/600 |

FOREIGN PATENT DOCUMENTS

| 63-177645 | 7/1988 | Japan . |
| 63-185147 | 7/1988 | Japan . |
| 63-185148 | 7/1988 | Japan . |

*Primary Examiner*—Jack K. Chiang
*Attorney, Agent, or Firm*—Foley & Lardner

[57] ABSTRACT

A key unit is provided with a first print substrate on which a contact portion and a LED capable to be mounted on flat surface are mounted, a conductive contact rubber, placed on the first print substrate, having a movable contact portion which can contact with the contact portion and an open portion in which the LED is accommodated, a key button placed on the conductive contact rubber, a LED lens, placed on the edge portion of the open portion of the conductive contact rubber, which leads the light beam generated from the LED in the open portion, and a key case having a through hole into which the key button is slidably inserted and a lens insertion hole into which the LED lens is inserted. The key unit may also be provided with a chip resistor to protect the LED, which is mounted on the first print substrate at a position below a lower end face of the key case. Further, a key button may be inserted into the through hole and a position where the LED lens is inserted into the lens insertion hole, the width of the LED lens is made to be shorter than that of the LED.

15 Claims, 23 Drawing Sheets

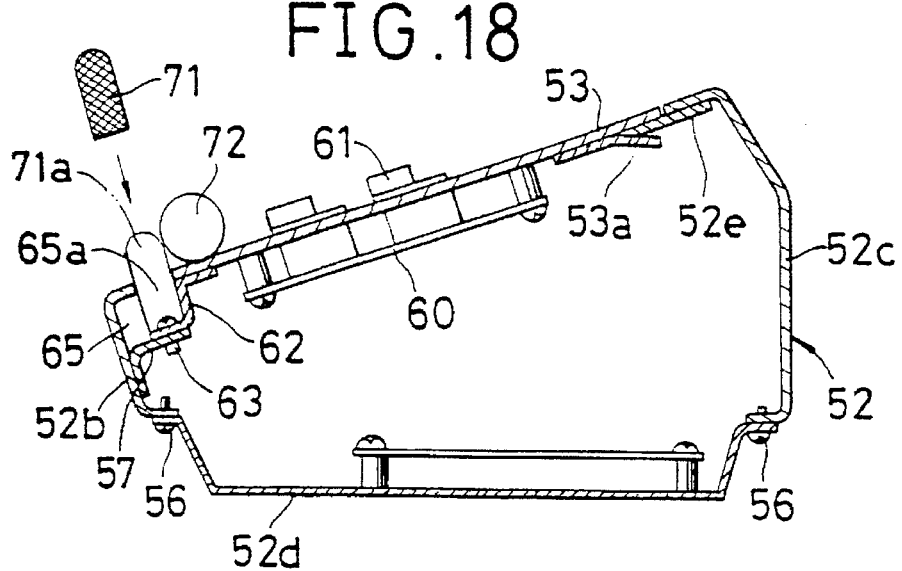
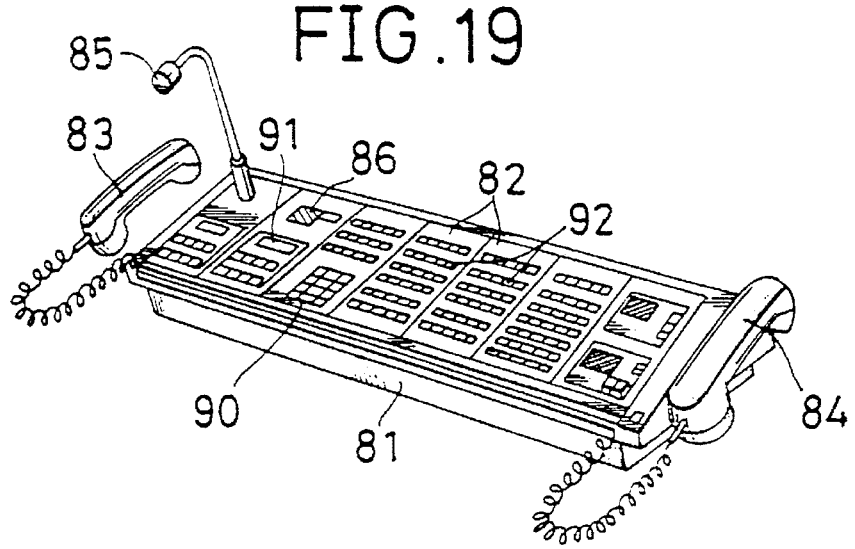
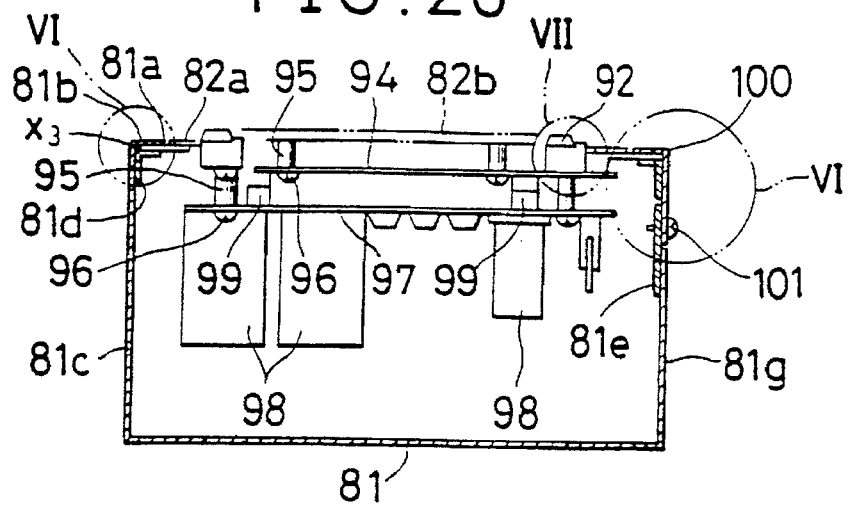

KEY UNIT

This application is a continuation-in-part of application Ser. No. 08/151,780, filed Nov. 15, 1993, abandoned, which is a file wrapper continuation of application Ser. No. 07/655, 293, filed Feb. 14, 1991, abandoned.

BACKGROUND OF THE INVENTION

1. Field of the Invention

The present invention relates to a key unit of a dealing board provided with various telephoning functions and adapted to be used as a terminal of a financial institution, such as banks and securities corporations.

2. Description of the Related Art

Generally speaking, the dealing board used as a financial terminal has a telephone function. Recently, a wide variety of functions has become available, with several functions of the terminal grouped and panelled in units. Customers can select their necessary units other than basic units and combine these selected units in order to construct the particular and custom-built dealing board.

Because the dealing board has telephone functions, it is constructed with a hand-set, a set of dialing buttons, function buttons, a display, a microphone, a speaker, and a set of switches for operating and controlling these instruments.

FIGS. 29 and 30, respectively show perspective and sectional views of the conventional dealing board of the kind described above.

As shown, a main body 131 of the dealing board is installed on a desk 132. A display system 133 displaying information, such as economic information, is installed on the front portion of the desk 132, and a control box 134 is placed under the desk.

Ordinarily, a control panel 139a of the main body 131 of the dealing board is apt to be slanted by an angle of the range of 10°–30° in order to make the operability of the dealing board good.

As shown in FIGS. 31 and 32, the main body 131 of the dealing board consists of the control panel 139a, the function buttons 135, a pair of print substrates 137 and 138 on which function circuits are mounted, and a case 139 containing these parts described above. These print substrates 137 and 138 are assembled in parallel with each other through a pair of bushings 140 and the assembly is installed on the inner face of the front-slanted control panel 139a by screws 141.

A plurality of steps or floors of junction print substrate 142 join the dealing board main body 131 to the control box 134, and the set of print substrates 143 and 144 is contained and installed on the bottom portion of the case 139.

According to the conventional dealing board shown, the control panel 139a is installed on the upper face of the boxlike case 139 so as to be inclined down toward the front, the bottom face 139d of the case 139 is placed horizontally, and the front and the rear faces 139b and 139c of the case 139 are situated at a right angle relative to the bottom face 139d.

In order to assemble the conventional dealing board, the case 139 of the dealing board main body 131 is inserted downward through an opening portion 132a of the desk 132, and the case 139 is fixed in place by a set of fixtures 145. In such a situation, a pair of vertical walls of the case 139 are placed at a right angle to the top plate of the desk 132, so when a user A sits on a chair in back of the dealing board, his knee B touches the front face 139b or a corner of the case as shown in FIG. 33, thereby blocking up free movement of the knee B of the user. Also, the person cannot sit on the chair comfortably, thereby creating early fatigue of the user disadvantageously.

It is possible, as apparent from FIGS. 30 and 33, to lengthen the length L of the top plate of the desk 132. However, a lengthening of the top plate generates inconveniently a large desk 132 occupying disadvantageously a large space of the office room when the dealing board with the large-size desk is installed therein.

Also, the main body 131 of the conventional dealing board has slanted print substrates 137 and 138 on which function buttons 135 are mounted and other print substrates 142, 143, and 144 fixed to the bottom of the case 139 are placed in a horizontal posture, whereby useless space H is created between the set of print substrates 137 and 138 and the set of print substrates 142, 143, and 144. As a result, the whole size of the case 139 becomes large, and heat generated from electronic parts mounted on the horizontal print substrates 143 and 142 is apt to be blocked by the top and the lower print substrates 143 and 144 and escapes through thermal stream 146, resulting in a bad heat radiation of the main body 131 of the dealing board.

In addition, the appropriate slanting angle θ of the dealing board varies according to the particular customer of the board, so that it has been necessary to manufacture the main body 131 of the dealing board having various slanting angles θ according to the particular desire of the user. That is, it is difficult to standardize the angle and a number of kinds of the main body of the dealing board must be produced, resulting in a difficulty of management for the production of the board.

The conventional dealing board has, as shown in FIGS. 34–37, a panel unit 154 adapted to be used by the user as a communication means, which unit includes a dial operation part 155, a display portion 157 such as liquid crystal, a number of key units 156 having automatic dialing functions, a volume control 158 for controlling the volume or darkness or brightness of the microphone and other key units and the display 157, and other control panels for various switches. These various parts contained in the panel unit 154 are arranged on a panel 159 and connected and secured to print substrates 160-1 and 160-2. The control panel of the dealing board is constructed by the parts of the panel unit 154 including a hand-set. Further, the dealing board deals with in function a number of clients or business connections, and the particular client can be called out with a single touch operation of buttons through the automatic dialing function. The automatic dialing function includes a display function depicting the name or symbol of the customer through a set of light emitting diodes in order to indicate the customer called out, which display function is placed near the key unit 156 of the automatic dial, and other functions indicating an arrival of a telephone call or the existence of a caller.

The names of customers can be memorized in the dealing board by the dialing function, but it is necessary to install on the board the panel unit 154 consisting of a number of key switches. It is preferable to construct the control panel of the dealing board by the panel unit 154 which unitizes or groups various functions in their kinds, because the dealing board has a number of functions. Consequently, the dealing board is constructed by selecting and combining function units, such as a display 133 and the like shown in FIG. 29, which are necessary to the customer, except the basic function unit.

In general, the conventional dealing board is mounted on the desk and a number of desks having the dealing boards mounted thereon are placed in an office room.

The desk with the dealing board has a display apparatus for selecting and displaying various economic information, book shelves and drawers. It is apparent that consequently a predetermined space of the desk top board is necessary to make operation of the dealing board easy and convenient. However, it is desirable to restrict the size of the desk in order to accommodate many desks in the dealing room. When the size of the desk is limited, it is necessary to shorten the depth of the desk, thereby obtaining small desks.

The conventional dealing board is constructed by a panel unit 154 as described above having multi-functions. Concerning the panel unit 154, the key switch 165 shown in FIG. 38 of the key unit 156 with automatic dialing function has an electric conductive contact rubber 165-2 used as a movable contact and a stable contact 165-3, which contact rubber is covered by a case 165-1 and the stable contact is fixed on the top face of the case 165-1. In addition, a terminal 165-4 connected to the stable contact 165-3 is soldered to be fixed to the print substrate 160-1. As a consequence, due to the existence of the terminal 165-4 protruding from the rear face of the print substrate 160-1, it is difficult to mount other elements or parts on the rear face of the print substrate 160-1, resulting in an impossibility of high density or compact mounting of elements on the print substrate 160-1. Similarly, the print substrate 160-1 is provided with light emitting diode (LED) 166 corresponding to respective key switches 165 of the key unit 156. A terminal 166-1 of the LED 166 is soldered to be fixed to the print substrate 160-1. As a consequence, due to the existence of the terminal 166-1 protruding from the rear face of the print substrate 160-1, it is difficult to mount other elements or parts on the rear face of the print substrate 160-1, resulting in an impossibility of high density or compact mounting of elements on the print substrate 160-1. Additionally, because the conductive contact rubber 165-2 is covered by the case 165-1 and contacts the key switch 165, an area occupied by the key switch 165 becomes large, making a miniaturizing of the panel unit 154 difficult.

A protective resistor 162-1 must be arranged on the outside of the key switch 165, causing a hindrance to a miniaturization of the panel unit 154.

According to the prior art, the panel unit 154 has been fixed to an opening portion of the main body of the dealing board by the method shown in FIG. 39.

That is, a fixing piece 171 and a fixture 172 are applied to the opening portion of the case 170, and another fixing piece 175 engaging with the fixing piece 171 and another fixture 177 contacting with the fixture 172 and covering the fixture 172 are installed at the side of the panel 173 so as to engage the fixing piece 175 at the side of the panel 173 with the fixing piece 171 at the side of the case 170. Screws 179 placed in the fixtures 172 and 177 are fastened by using a tool 178, such as a screwdriver, inserted through the bottom portion of the case 170 after the fixture 177 at the side of the panel 173 is mounted on the fixture 172 at the side of the case 170. Thus, the panel 173 is secured to the case 170.

According to the fixing mechanism of the prior art as shown in FIG. 40, the panel 173 is fixed to the opening portion of the case 170 by securing the fixing piece 171 to the opening portion and driving the screw 179 to fasten the panel 173 fitted in the opening portion from the top to the fixing piece 171.

The reference numeral 173a indicates function buttons placed in the panel 173.

It is necessary to turn over the case 170 when the tool 178 is inserted from the bottom of the case 170 of the fixing arrangement shown in FIG. 39 and used to fasten the screw 179.

However, the case 170 has a plurality of panels 173 neatly arranged and secured thereto and the gap between panels 173 is adjusted neatly to the fixed distance obtaining a good appearance. Consequently, when the case 170 must be turned over as mentioned above and the panels 173 are secured thereto, it is necessary to turn over the case 170 and exchange several panels 173 every time it is intended to change the combination of the panels 173. When it is found that the gaps between the panels are not equal after the exchange, the case 170 must be again turned over and the same work repeated. It is explicitly troublesome and time-consuming.

When another fixing construction as shown in FIG. 40 is employed, in which the panel 173 is secured to the case 170 by means of the screw 179 inserted from above the panel 173, a head of the screw 179 is exposed, thereby deteriorating an appearance of the case 170.

In general, the control panel of the dealing board main board is slanted downwardly in order to develop an operability of the control panel and there is no space for pencils or other writing instruments and the like to be held thereon, on the panel 173, so that when a pencil or writing instrument is carelessly put on the slanted panel 173 the instrument will roll down from the panel and become lost thereby hindering a smooth working of a user of the control panel.

The conventional dealing board generally used as a financial terminal deals with transactions of bonds, foreign exchanges, and stocks through telephone lines, so some telephoning functions are installed on the board.

The telephoning function has a one-touch or one-switching function for calling a customer instantly or by one-pushing. However, because recently a number of the customers has increased due to a variability of the business, it has been difficult to adapt the one-switching operation system to all customers.

Consequently, according to the recent trend, a plasma display is mounted on the dealing board, which displays the names of customers and telephone numbers. Merely touching the particular name by a finger can call out the customer.

There are other kinds of dealing boards having expanded functions. According to one development, names and telephone numbers of the customers are previously memorized in a memory card and the memory card is inserted in an insertion slot of the dealing board, so that the content of the card is displayed on the plasma display. Using the dealing board of the kind above, the user always holds his or her own memory card and the user can call out the user's customers through the dealing boards other than his or her own dealing board and carry out transactions.

The dealing board to which memory cards are used has a reader-writer installed in the board so as to read and write information in the memory card, and the memory card is inserted into the card insert slot of the reader-writer.

A card take-out button for taking out the memory card inserted is protrudingly formed near the reader-writer. A cover 181 is fixed to the card insertion slot as shown in FIG. 41 through a set of screws 180 in order to prevent the card take-out button from being accidently touched during a use of the dealing board, and foreign matter such as dust and trash from entering or invading into the card insertion slot, thereby damaging the reader-writer during a non-use of the dealing board.

However, according to the prior art, the conventional cover 181 is fixed to cover the card insertion slot by means of screws 180, so that it is necessary to remove the screws 180 and the cover 181 every time the dealing board is used.

It is troublesome to remove and fix the screws and the cover. The cover 181 is apt to be missed after the cover is removed from the dealing board main body and accidently lost.

SUMMARY OF THE INVENTION

According to a first embodiment of the invention, the key unit is provided with a first print substrate on which a contact portion and a LED capable to be mounted on a flat surface are mounted, a conductive contact rubber, placed on the first print substrate, having a movable contact portion which can contact with the contact portion and an open portion in which the LED is accommodated, a key button placed on the conductive contact rubber, a LED lens, placed on the edge portion of the open portion of the conductive contact rubber, which leads the light beam generated from the LED in the open portion, and a key case having a through hole into which the key button is slidably inserted and a lens insertion hole into which the LED lens is inserted.

As a consequence, as the LED lens is placed on the conductive contact rubber, it is possible to prevent the LED lens from rattling by means of the resiliency of the conductive contact rubber. Further, the LED is accommodated in the open portion, so that it is possible for the light beam generated from the LED to be prevented from breaking through. Still further, the LED and the contact portion are mounted on a flat surface on the print substrate, so that there is no terminal protruding from the rear face of the print substrate, resulting in a possibility of high density or compact mounting of elements on the print substrate.

According to a second embodiment of the invention, the key unit is provided with a chip resistor to protect the LED, which is mounted on the first print substrate at a position below a lower end face of the key case. As a consequence, it is possible to diminish the gap distance between respective key cases of the key unit and the arrangement pitch of the key unit, and to lessen the depth construction of the dealing board.

According to a third embodiment of the invention, in a sectional shape on the line between a position where the key button is inserted into the through hole and a position where the LED lens is inserted into the lens insertion hole, the width of the LED lens is made to be shorter than that of the LED. As a consequence, it is possible to diminish the width of the key case between the button area (the top face of the key button) and the lens area (the top face of the LED lens), as seen from the outside appearance of the key unit.

According to a fourth embodiment of the invention, the key unit is further provided with a second print substrate electrically connected to the first print substrate through connectors, a flat-pack integrated circuit part mounted on the first print substrate on an opposite face of the first print substrate on which the contact portion and the LED are mounted, which has the function for integrating a number of matrix information from the LED and the switching mechanism which consists of the contact portion and the movable contact portion, and a second integrated circuit part mounted on the second print substrate, which has the function for controlling the flat-pack integrated circuit part.

As a consequence, it is possible to ensure the mounting area of the switching mechanism and the LED on the first print substrate, to carry out a high density or compact parts mounting on the print substrate, and to reduce some print substrates and connectors thereby miniaturizing the panel unit and curtailing the manufacturing cost.

According to a fifth embodiment of the invention, the lens insertion hole is provided with a fitting portion at the opening position of the lens insertion hole, the LED lens is provided with the receiving portion, and the fitting portion is contacted with the receiving portion when LED lens is inserted into the lens insertion hole. As a consequence, it is possible to prevent the LED lens from coming out of the lens insertion hole.

According to a sixth embodiment of the invention, while the LED lens is placed on the conductive contact rubber, the conductive contact rubber pushes upwardly the LED lens, so that the fitting portion is pressed with the receiving portion. As a consequence, it is possible to prevent the LED lens from coming out of the lens insertion hole by means of the resiliency of the conductive contact rubber.

According to a seventh embodiment of the invention, the LED lens has a flange portion on the bottom face of the LED lens, and the LED lens is placed on the conductive contact rubber so as to hide the flange portion below a lower end face of the key case. As a consequence, it is possible to diminish the width of the key case.

According to an eighth embodiment of the invention, the LED lens is of a separate type, in which the front portion is a diffusing lens and the rear portion is a leading lens. As a consequence, the leading lens transfers effectively upward the light beam generated from the LED to the diffusing lens, so that the diffusing lens diffuses upwardly the light beam through the leading lens, resulting in enlarging the area of the light beam.

According to a ninth embodiment of the invention, the LED lens is of a one body type, in which the front portion is a diffusing lens and the rear portion is a leading lens. As a consequence, as well as the effect of the other eight inventions described above, it is possible to reduce parts in relation with the LED lens.

Accordingly, it is a first purpose of the present invention to provide a key unit to be prevented from rattling the LED lens and to allow for a high density or compact mounting of elements on the print substrate.

It is a second purpose of the present invention to provide a key unit to diminish the gap distance between respective key cases of the key unit and the arrangement pitch of the key unit and to lessen the depth or width of the panel unit miniaturizing the whole construction of the dealing board.

It is a third purpose of the present invention to provide a key unit to diminish the width of the key case between the button area and the lens area, as seen from the outside appearance of the key unit.

It is a fourth purpose of the present invention to provide a key unit enabling to mount elements in a high density on the print substrate and to reduce or omit the number of the print substrate and jointing connectors, resulting in miniaturization and cost-reduction of the dealing board.

It is a fifth purpose of the present invention to provide a key unit to be prevented from coming out the LED lens from the lens insertion hole.

It is a sixth purpose of the present invention to provide a key unit to be prevented from coming out the LED lens from the lens insertion hole by means of the resiliency of the conductive contact rubber.

It is a seventh purpose of the present invention to provide a key unit to diminish the width of the key case.

It is an eighth purpose of the present invention to provide a key unit to enlarge the area of the light beam.

It is a ninth purpose of the present invention to provide a key unit to reduce parts in relation with the LED lens.

BRIEF DESCRIPTION OF THE DRAWINGS

FIG. 18 is a section of the other embodiment of the dealing board main body.

FIG. 19 is a perspective view of the dealing board main body to which another embodiment relates.

FIG. 20 is a section of the main body of the same dealing board.

DETAILED DESCRIPTION OF PREFERRED EMBODIMENTS

Figure 1:
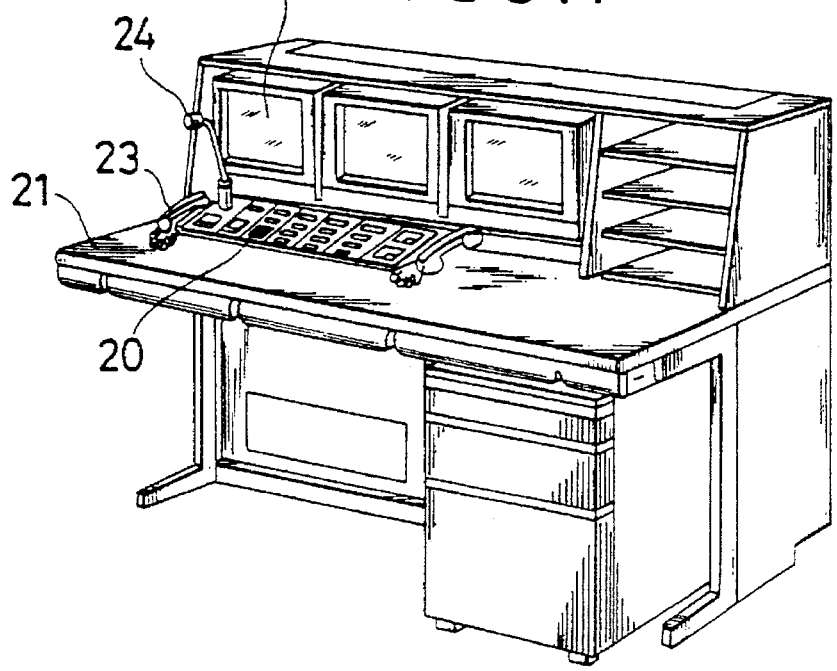
FIG. 1 is a perspective view showing the whole structure of the dealing board concerning the embodiments described herein.

As clearly depicted in FIG. 1, the dealing board of the present invention includes a main body 20, a desk 21, a display 22 displaying economic information, a hand-set 23, and a microphone 24.

Figure 2:
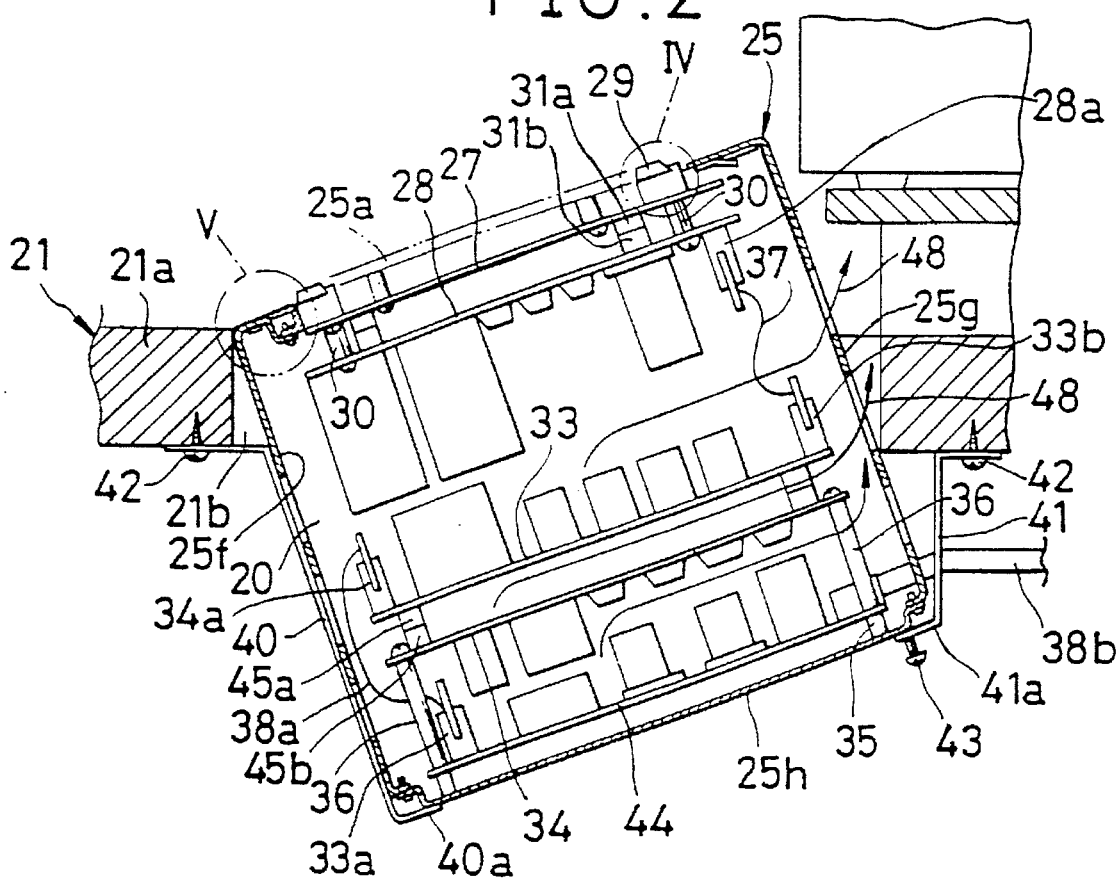
FIG. 2 is a section showing the dealing board main body.

The dealing board main body 20 has a box-like case 25, as shown in FIG. 2, and the case 25 has a control panel 25a fixed to the top face of the case.

A bottom face 25h of the case 25 is in parallel with the control panel 25a, and the front face 25f and the rear face 25g of the case 25 are at right angles to the control panel 25a.

Figure 4:
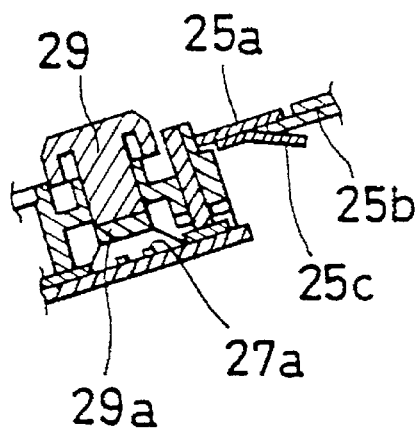
FIG. 4 is an enlarged view of the portion shown by IV in FIG. 2.
Figure 5:
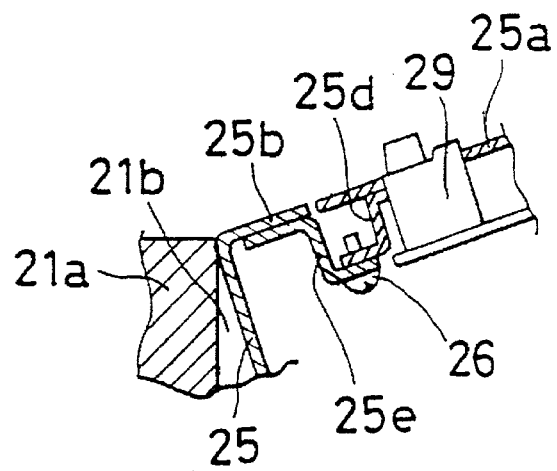
FIG. 5 is also an enlarged view of the portion of V in FIG. 2.

The assembling process of the control panel 25a to the case 25 will be described. It is apparent from FIG. 4 that, at the rear portion of the control panel, there is an engagement piece 25c to be engaged from below with the edge portion 25b of the opening formed in the case 25, and a fixing piece 25d of substantially an L-shape as shown in FIG. 5 so as to attach to the front portion of the control panel. The engagement piece 25c is engaged with the edge portion 25b of the opening as shown in FIG. 4 and the fixing piece 25d is secured to a stable piece 25e protruding downward from the edge portion 25b by means of a screw 26 as shown in FIG. 5, thereby the control panel 25a is secured to the case 25.

On the other hand, two layers of the upper and the lower print substrates 27 and 28 are placed under the control panel 25a (FIG. 2).

The upper print substrate 27 has a function button 29 exposed from the control panel 25a, and a spacer 30 is placed between respective print substrates 27 and 28. These print substrates 27 and 28 are fixed on the rear face of the control panel 25a so as to be parallel to each other. A pair of connectors 31a and 31b joins electrically the upper print substrate 27 to the lower one 28.

The function button 29 installed on the upper print substrate 27 has a conductive contact rubber 29a (see FIG. 4) at its lower end. Pushing down the function button 29 makes the conductive contact rubber 29a contact the contact 27a formed on the print substrate 27 so as to carry out ON-OFF operation of the circuit.

In addition, other print substrates 33, 34, and 44 are securely installed in the bottom space of the case 25.

The lower print substrate 44 is installed in the bottom space so as to be in parallel with the bottom face 25h of the case 25 through a set of spacers 35. The upper print substrate 34 is placed above the lower print substrate 44 in parallel with the print substrate 44 through a set of other spacers 36. The other upper or top print substrate 33 is connected to the upper print substrate 34 securely by connectors 45a and 45b.

Both the print substrates 33 and 44 are electrically connected to each other by a system of the connector 33a, a signal cable 38a, and the other connector 34a.

Respective print substrates 33 and 28, which are secured to the side of the control panel 25a, are electrically connected by means of a system of connectors 28a and 33b, and a signal cable 37, as well as the bottom print substrate 44 and a main body of a telephone exchanger (not shown) are connected by a signal cable 38b.

The top plate 21a of the desk 21 on which the dealing board main body 20 is mounted has an open portion 21b open a little larger than the area of the dealing board main body 20. On the lower face of the open portion 21b, fixtures 40 and 41 are secured.

The fixture 40 installed at the front side of the open portion 21b is longer than that at the rear side of the open portion 21b. Both upper end portions of the fixtures 40 and 41 are secured to the lower face of the top plate 21a by small screws 42. The lower portion of the front fixture 40 is rearward slanted and has a lowest L-shape end portion or engagement portion 40a.

The other rear fixture 41 has a main portion extending in a right angle to the top plate 21a and a top end portion extending from the main portion at a right angle and being secured to a bottom face of the top plate 21a by a small screw 42 as described above. In addition, the fixture 41 has a bottom or lowest engagement portion 41a extending slantly and downward and an angle adjusting screw 43 is inserted from below through the lowest engagement portion 41a.

The bottom face 25h of the case 25 of the dealing board main body 20 inserted from above through the open portion 21b of the desk 21 is supported from the bottom by a front end of the angle adjusting screw 43 and the engagement portion 40a of the fixture 40 so as to slant to the front the control panel 25a relative to the upper face of the top plate 21a of the desk 21.

By adjusting the angles of the fixtures 40 and 41 and the angle adjusting screw 43 before inserting the dealing board main body 20 through the open portion 21b, it is possible to adjust at will the angle of the control panel 25a of the dealing board main body 20 according to the particular demand of the customers.

According to the embodiment above, the fixing angle of the front fixture 40 is set so as to make the slanting angle θ of the control panel 25a about 20° degrees.

Figure 3:
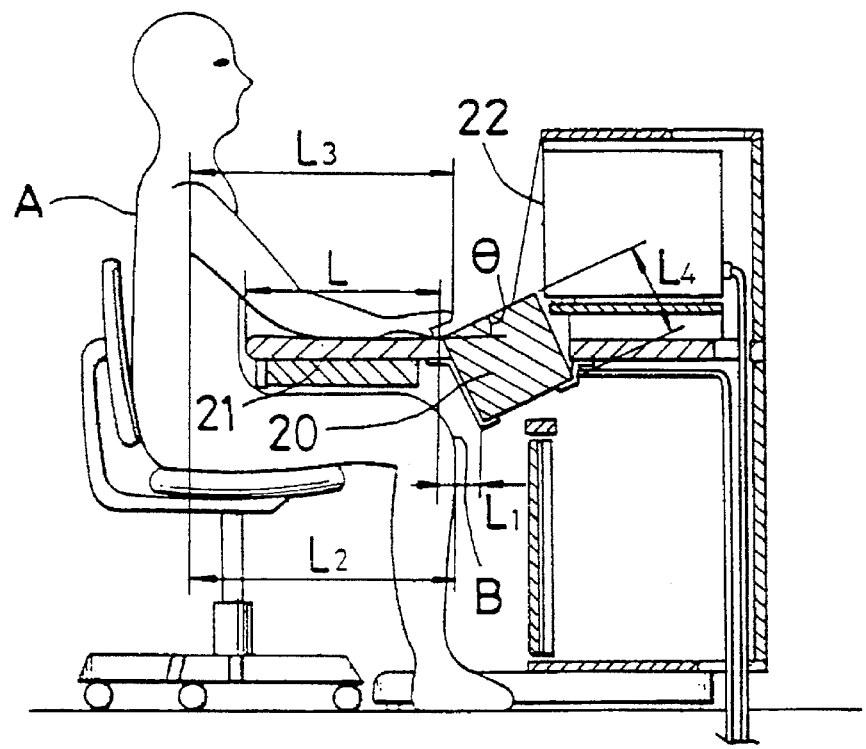
FIG. 3 is a section showing a usage condition of the dealing body.

As a result, presupposing that the length L of the top plate of the desk 21 is about 350 mm, the length $L_2$ of legs of the user is about 500 mm, the working space $L_3$ is about 450 mm, and the length $L_4$ of the dealing board main body 20 is about 200 mm as shown in FIG. 3, a slanting distance $L_1$ of the bottom face of the dealing board main body 20 becomes about 68 mm. This distance is sufficient for general users, so that even when the length L of the top plate is made short, the knee B of the user A will hardly hit the main body 20, resulting in a small size of the desk 21.

Because the print substrates 33, 34, and 44 are fixed in the bottom space of the main body 20 in parallel with the top face of the control panel and the case 25 is installed slantly, these print substrates 33, 34, and 44 are slanted, so that heat stream 48 shown by an arrow in FIG. 2 flows along these print substrates 33, 34, and 44 effectively radiating heat generated from the various electronic parts mounted thereon.

According to the embodiment above, the engagement piece 25c and the fixing piece 25d are secured to the control panel 25a through, for example, a welding method, however they may be formed by a molding process of resin. In the latter case, the control panel 25a, the case 25, and the fixing piece 25d at the case side may be molded.

Furthermore, the front and the rear walls 25f and 25g of the case 25 are formed so as to be at a right angle to the plane of the control panel 25a, however it is not necessary to form these walls and right and left walls (not shown) of the case 25 at a right angle to the control panel 25a on condition that at least the bottom face 25h is in parallel with the control panel 25a. These walls may be arranged in a shape of a diamond, seen from the right or left side of the case 25.

Figure 6:
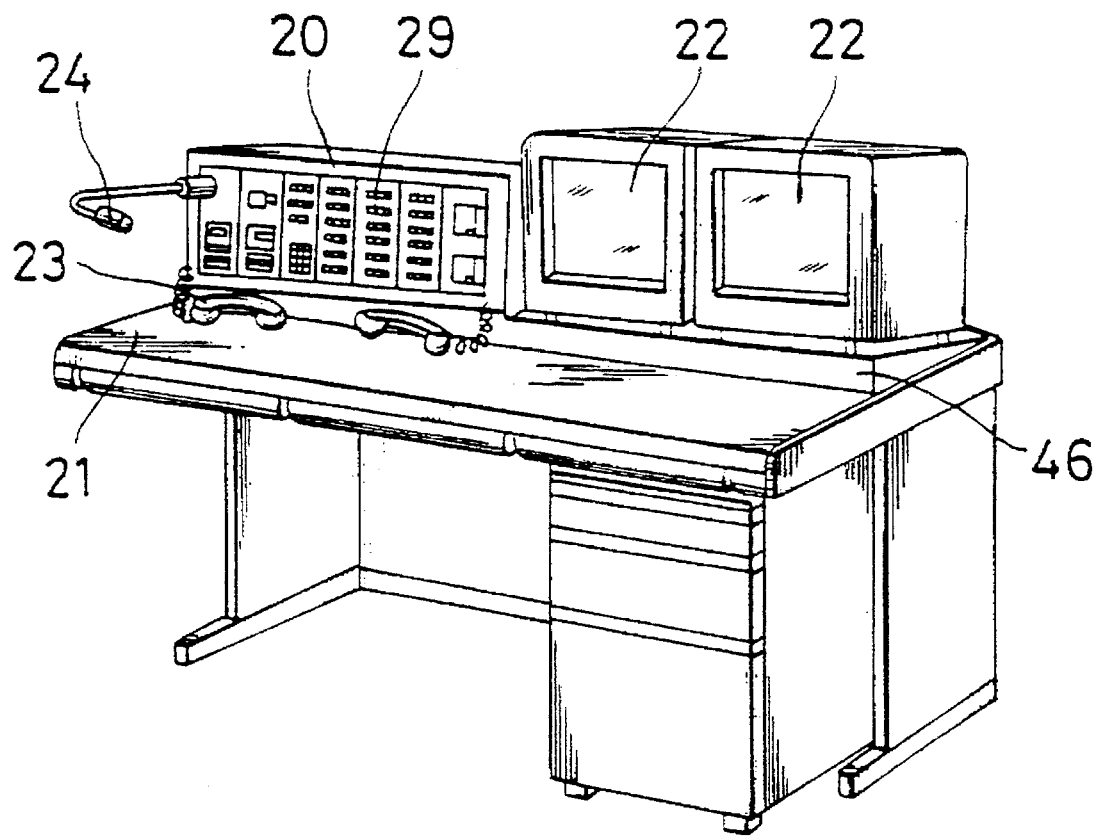
FIG. 6 is an explanation view showing another embodiment.

FIG. 6 shows another embodiment of the present invention, in which the desk 21 has a display stand 46 placed on its rear space, which stand is slanted by a predetermined angle and on which stand the dealing board main body 20 is placed. As a consequence, the control panel 25a of the case 25 is slanted and it is not necessary to form the open portion 21b in the top plate 21a of the desk 21, using the top plate of the desk 21 effectively.

It is of course apparent that the embodiment above can be applied to various electronic apparatuses and devices provided with functional switches on the control panel.

As described in detail above, because the front face of the dealing board main body having the forward-slanted control panel is slanted rearward or backed horizontally, the further the portion of the case wall is lowered, the further the front face of the dealing board main body is separated from the user's knee and consequently the top plate of the desk can be shortened. This is economical because the number of the dealing boards to be installed in a particular dealing room can be increased.

In the dealing board described in detail above, the bottom face of the dealing board main body and the print substrates contained in the main body are placed in parallel with the control panel, so that no useless space is generated between the bottom plate and the print substrates, and respective print substrates, thereby improving the element mounting space efficiency.

As a consequence, it is possible to miniaturize the dealing board main body and to contain the print substrates which are installed within the control box according to the prior art, in the dealing board main body, so that it is not necessary to use any joining print substrate and connectors for connecting the dealing board main body and the control box, thereby reducing the number of parts to be used and improving the reliability of the dealing board.

Additionally, because the print substrate is slantingly installed, heat generated from the electronic parts installed or mounted on the print substrates rises along the print substrates, thereby cooling them. It is possible to reduce the disadvantages of deterioration of electronic parts and shortening of the life of them due to thermal effects.

In the dealing board described in detail above, the dealing board has a fixing member for slantingly securing the main body of the dealing board to the desk in order to adjust freely the slanting angle of the control panel on the main body, so that it is possible to set the angle of the control panel according to demands of the customer and to standardize the dealing board main body. It is not necessary to manufacture these dealing board main bodies according to the client and to prepare previously main bodies of several kinds, thereby simplifying management of the main bodies.

Next, still another embodiment of the panel unit or control panel will be described.

Figure 7:
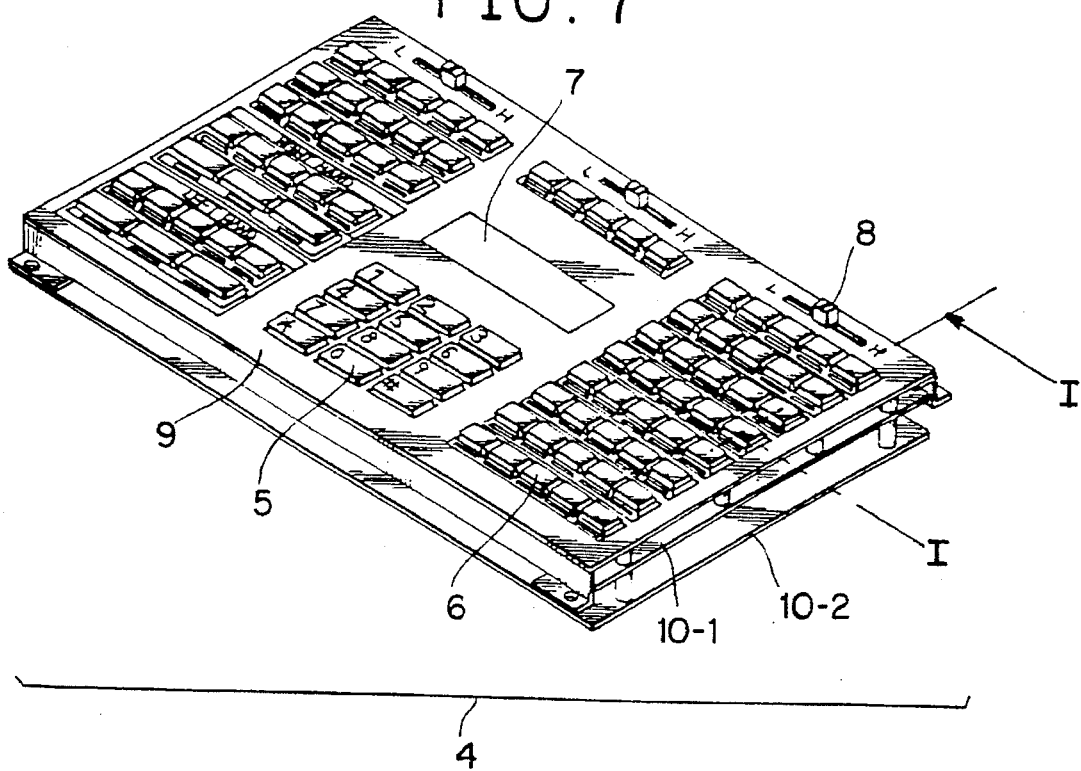
FIG. 7 is a perspective view of the panel units of the dealing board concerning another embodiment.
Figure 8A:
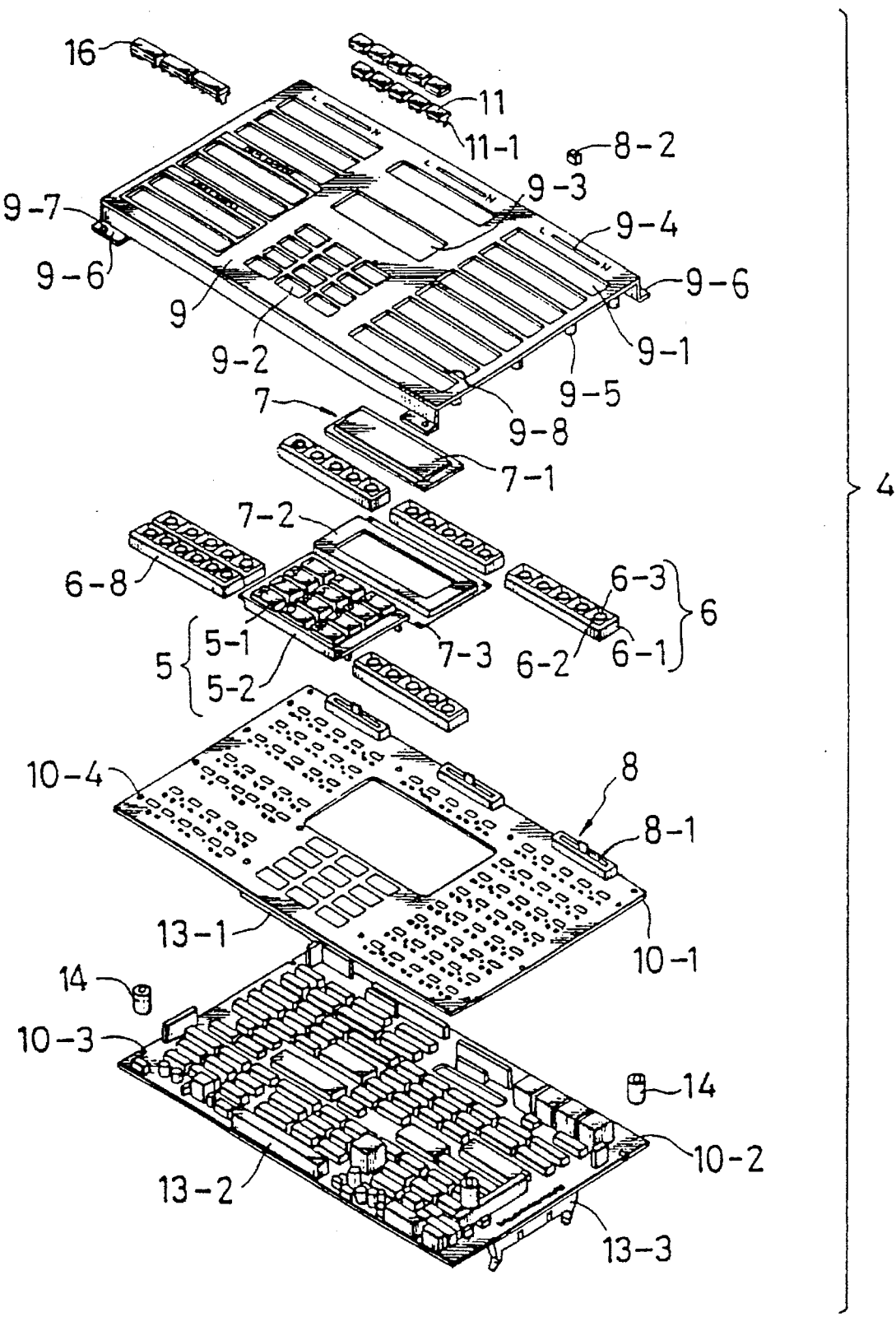
FIG. 8(a) is an exploded perspective view of the panel units.
Figure 8B:
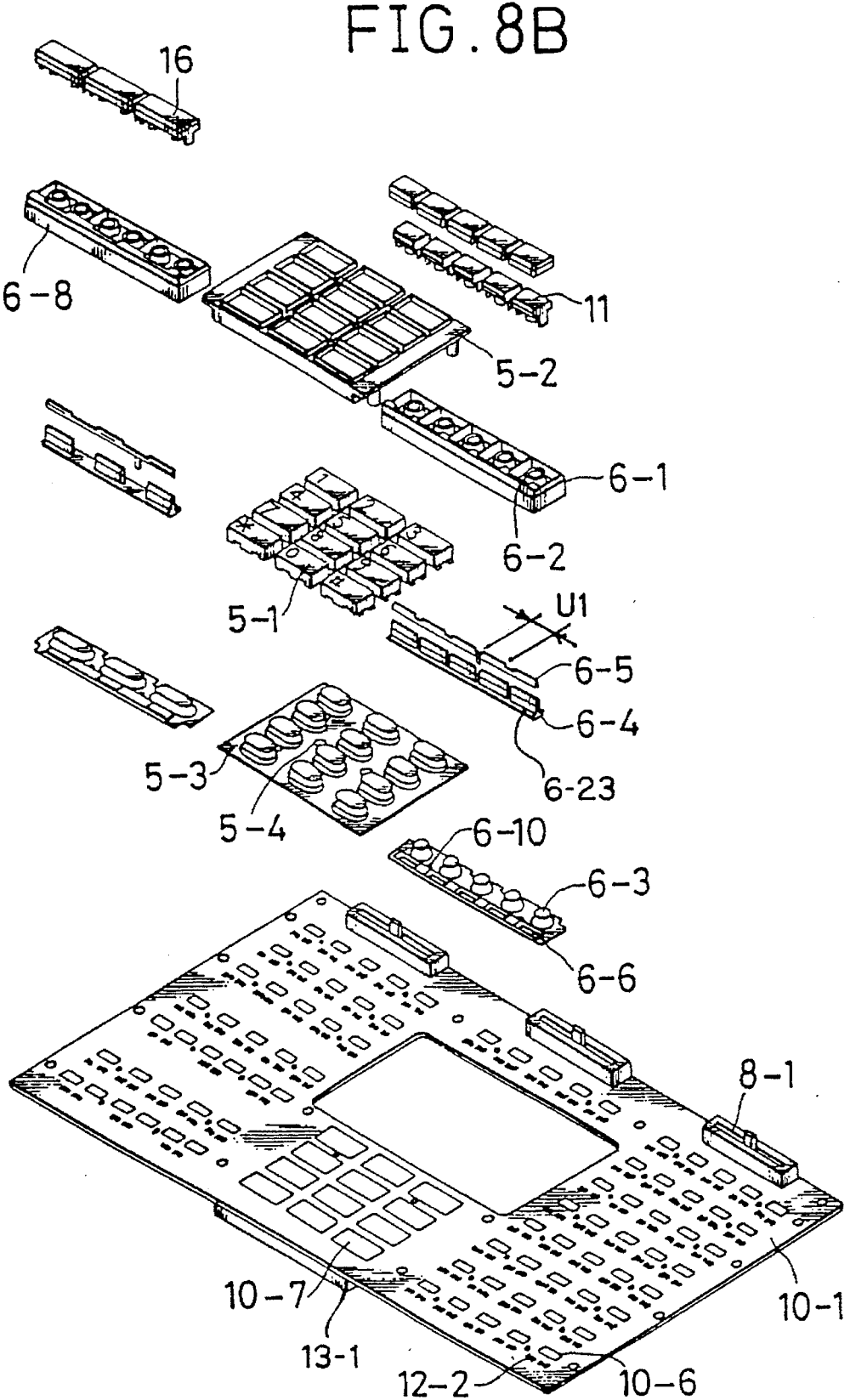
FIG. 8(b) is an exploded perspective view of the constituent parts mounted on the print substrate of the panel unit.
Figure 9:
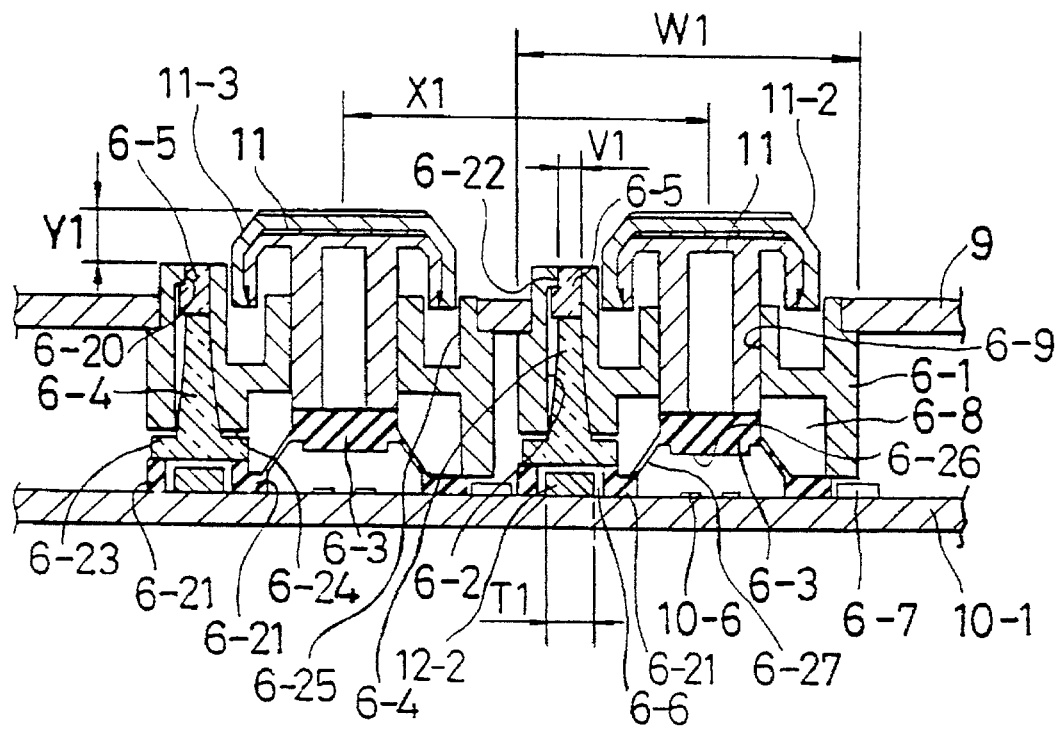
FIG. 9 is a section on the line II—II in FIG. 7, depicting a portion of the key unit constituting the panel unit.

FIG. 7 is a perspective view of the panel units of the dealing board of the embodiment above, FIG. 8(a) is an exploded perspective view of the panel units of the embodiment above, FIG. 8(b) is an exploded perspective view of the constituent parts mounted on the print substrate of the panel unit above, and FIG. 9 is a section on the line II—II in FIG. 7, depicting a portion of the key unit constituting the panel unit of the embodiment above. As shown explicitly, a panel 9 has a set of openings 9-1 on which key units 6 having automatic dialing functions are mounted, and another set of openings 9-2 on which a dialing portion 5 is mounted. These sets are arranged in plural rows and plural lines. Furthermore, the panel 9 has an opening portion 9-3 on which a display 7 is mounted, and an opening portion 9-4 on which a volume control 8 of various displays 7 is mounted. If necessary, it is possible to place the opening portion 9-4 for the volume control 8 under the panel 9 or between the openings 9-1 and 9-2 formed in line.

On the bottom face of the panel 9, a plurality of fixing devices 9-5 having female screws for securing the print substrate 10-1 are formed at suitable positions of the bottom face. In order to fix the panel 9 to the dealing board 1, upper and lower end faces of the panel 9 are bent in a L-shape. At both ends of the upper and the lower end faces, there are engagement claws 9-6 having respectively fixing holes 9-7.

The dialing portion 5 includes dialing buttons 5-1 and a dialing button case 5-2 for slidably holding the buttons.

The key case 6-1 constituting a key control portion of the key unit 6 is provided with, as shown in FIG. 9, a through hole 6-9 into which a key button 11 is slidably inserted in an up-and-down direction and a lens insertion hole 6-2 for holding LED lenses 6-4 and 6-5 which leads effectively upward the light beam generated from the LED chip 12-2 mounted on the print substrate 10-1. Also, the LED chip 12-2 is capable to be mounted on a flat surface. In addition, the key case 6-1 is provided with a fitting portion 6-20 on the opening position of the lens insertion hole 6-2, so that the LED lenses 6-4 and 6-5 are prevented from falling off by means of the fitting portion 6-20.

Further still, the key case 6-1 is provided with a groove 6-25 between the lens insertion hole 6-2 and the through hole 6-9. The key button 11 has a skirt portion 11-3 on the top portion of the key button 11. When the key button 11 is pushed into the through hole 6-9, the skirt portion 11-3 is prevented from bumping the key case 6-1 by means of the groove 6-25. Additionally, the skirt portion 11-3 and the groove 6-25 can prevent dust from coming into the print substrate 10-1.

The key button 11 is fitted into the through hole 6-9 and is prevented from falling off by means of a claw 11-1 formed on the key button 11.

The display 7, such as a transparent liquid crystal device (LCD), is constructed by a cover 7-1 and an LCD 7-2 and is secured to the open portion 9-3 formed in the panel 9 by a screw and a fixing hole 7-3.

Figure 10:
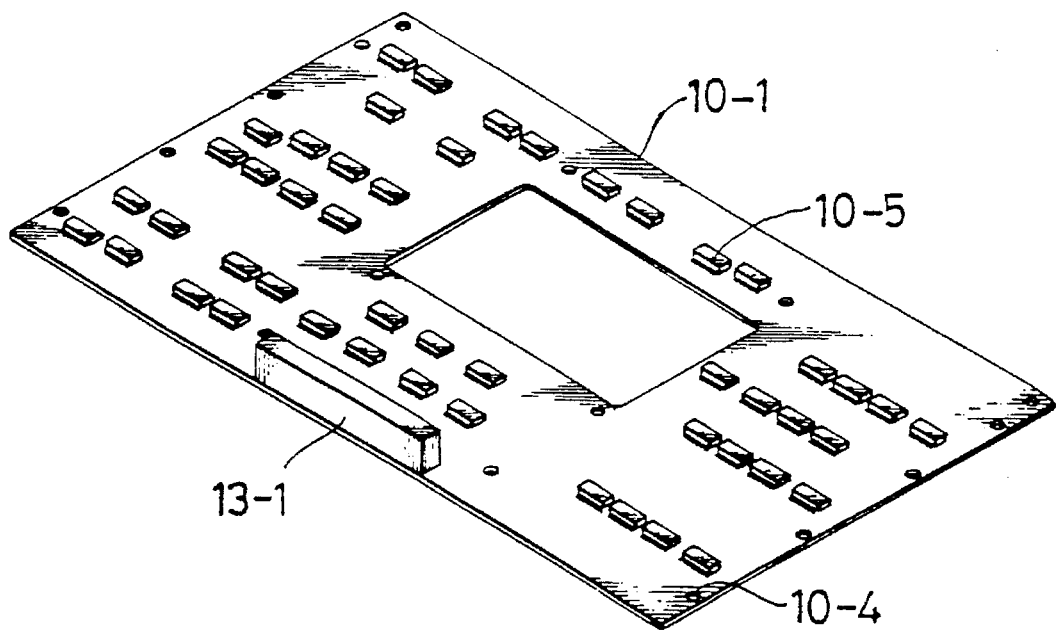
FIG. 10 is a perspective view showing a rear face of the print substrate constituting the key unit.

A volume control 8-1 operable through a volume button 8-2 is placed at the predetermined position on the print substrate 10-1, and key buttons 11 of the key unit 6 and dialing buttons 5-1 of a dial control portion 5 are installed on the print substrate 10-1 so as to form a circuit. As shown in FIG. 10, flat packs IC 10-5 capable of being mounted on flat surfaces are mounted on the opposite side of the contact constituting face. The flat pack IC 10-5 has functions of integrating matrix information of a number of switches and LEDs. The integrated information is transferred to the print substrate 10-2 through connectors 13-1, 13-2 and the integrated information is treated by ICs and the like mounted on the print substrate 10-2.

These print substrates 10-1 and 10-2 are secured to the panel 9 through a set of fixing holes 10-3, 10-4 and bushings 14, so that the key unit 6 and the dial control portion 5 are installed on the panel 9 constituting a panel unit 4.

In addition, the print substrate 10-1 has a set of contacts 10-6, 10-7 corresponding to the dial control portion 5 and the key unit 6. These contacts 10-6, 10-7 are formed by printing conductive carbon paste. It is possible to form the contacts with metallic material through a welding process.

Conductive contact rubbers 5-3, 6-3 are used in a switch mechanism for turning these contacts 10-6 and 10-7 ON-OFF.

On the print substrate 10-1, the LED chip 12-2 which, corresponding to respective the contacts 10-6, is capable to be mounted on a flat surface, is mounted. In addition, the conductive contact rubber 6-3 includes a main body having a movable contact 6-26, a leg portion 6-21 and a supporting portion 6-27 which connects the main body with the leg portion 6-21 and supports the main body in up-and-down direction. The conductive contact rubber 6-3 has an open portion 6-6 formed in the leg portion 6-21 on the one side of the conductive contact rubber 6-3, as shown in FIG. 8(b) and FIG. 9.

The LED lens which is inserted into the lens insertion hole 6-2 includes two type lens, a leading lens 6-4 which leads the light beam generated from the LED chip 12-2 and a diffusing lens 6-5 which diffuses the light beam through the leading lens 6-4.

In addition, the leading lens 6-4 has a flange portion 6-23 on the rear end portion of the leading lens 6-4. The diffusing lens 6-5 has a receiving portion 6-22 which is adapted to fit in the fitting portion 6-20 of the key case 6-1 when the diffusing lens 6-5 is pushed into the lens insertion hole 6-2 upwardly by the leading lens 6-4. Thus, the diffusing lens 6-5 is prevented from coming out from the lens insertion hole 6-2 and the top face of the diffusing lens 6-5 is made to fit exactly with the top face of the key case 6-1.

Here, the assembly process of the key unit 6 will be described.

The key case 6-1 of the key unit 6 is installed downward. The diffusing lens 6-5 is inserted into the lens insertion hole 6-2 and the leading lens 6-4 is placed on the diffusing lens 6-5, so that the fitting portion 6-20 of the key case 6-1 is fitted in the receiving portion 6-22 of the diffusing lens 6-5. Also, the conductive contact rubber 6-3 is placed in the open portion 6-8 of the key case 6-1, and a guide hole 6-10 for guiding the conductive contact rubber 6-3 in the conductive contact rubber 6-3 is applied to a protruded portion (not shown) formed in the key case 6-1, so that the conductive contact rubber 6-3 is held in place (FIG. 9).

As a consequence, the leg portion 6-27 of the conductive contact rubber 6-3 is placed on the leading lens 6-4, so that the leading lens 6-4 is held between the bottom face of the diffusing lens 6-5 and the top face of the leg portion 6-27 of the conductive contact rubber 6-3.

The conductive contact rubber 5-3 is held in place by the fact that the dial button case 5-2 of the dial control portion 5 is downward installed similar to the key case 6-1 of the key unit 6, a dial button 5-1 is installed on the dial button case 5-2 so as to make a character of the dial button 5-1 face downward, the conductive contact rubber 5-3 is installed on the dial button case 5-2 so as to face a contact portion of the conductive contact rubber 5-3 upward, and the guide hole 5-4 formed in the conductive contact rubber 5-3, similar to that of the key unit 6, is inserted into the protrusion portion (not shown) formed on the dial button case 5-2.

The key unit 6 and the dial control portion 5 respectively constructed as described above are installed downward in respective open portions 9-1 and 9-2 of the panel 9 facing downward. It is noted that the display 7 of the LCD and the like are previously secured to the panel 9. The print substrate 10-1 is mounted on the panel 9 so as to face respective contacts 10-6 and 10-7 down to the key unit 6 and the dial control portion 5 installed in the panel 9, and the fixing hole 10-4 of the print substrate 10-1 is aligned with the hole of the fixing device 9-5 of the panel 9, the print substrate 10-2 is placed on the bushing 14 so as to align the bushing 14 with the holes of the print substrate 10-1 and the panel 9, then they are fastened by a screw in order to construct the panel unit 4.

According to this above described assembly construction, as shown in FIG. 9, the flange portion 6-23 of the leading lens 6-4 is pushed upwardly by the resiliency of the leg portion 6-21 of the conductive contact rubber 6-3. Then, the diffusing lens 6-5 is pushed upwardly by the leading lens 6-4, so that the receiving portion 6-22 of the diffusing lens 6-5 is fitted in the fitting portion 6-20 of the lens insertion hole 6-2. As a consequence, the LED lens 6-4 and 6-5 are prevented from rattling by means of the resiliency of the conductive contact rubber 6-3. (Incidentally, there is a space between the flange portion 6-23 of the leading lens 6-4 and the lower end face 6-24 of the key case 6-1, which is predeterminedly set.)

Additionally, when the key unit 6 installed on the panel 9 is placed on the print substrate 10-1, the LED chip 12-2 mounted on the print substrate 10-1 is accommodated surroundingly in the open portion 6-6 formed on the leg portion 6-21 of the conductive contact rubber 6-3 in the key unit 6. Also, the leading lens 6-4 inserted into the lens insertion hole 6-2 is set so as to place just on the LED chip 12-2 accommodated in the open portion 6-6. Further, the LED chip 12-2 is completely surrounded with the print substrate 10-1, the conductive contact rubber 6-3 and the leading lens 6-4, so that the light beam generated from the LED chip 12-2 is prevented from breaking through.

Still further, in order to shorten the pitch X1 as shown in FIG. 9 between two key buttons 11, it is necessary to shorten the width W1 of the key case 6-1 which, corresponding to respective key button 11, has the lens area (i.e., the top face of the diffusing lens 6-5) and the button area (i.e. the top face of the key button 11) as seen from the outside appearance of the key unit 6. Thus, the diffusing lens 6-5 is made to have, for example, a width of 1 mm, a half of the conventional LED's width of 2 mm, so that the diffusing lens 6-5 can be placed adjacent to the key button 11 by 1 mm. Still more, though the diffusing lens 6-5 is made to have the width V1 of 1 mm, the LED chip 12-2 is made to have the width T1 of 2 mm equal to the conventional LED's width (about 2 mm) and emits the quantity of the light beam equal to that of the conventional LED.

The leading lens 6-4 inserted into the lens insertion hole 6-2 has a role to transfer effectively upward the light beam generated from the LED chip 12-2 to the diffusing lens 6-5, so that the diffusing lens 6-5 diffuses upwardly the light beam through the leading lens 6-4 and has a role to enlarge an area of light beam.

As the top face of the diffusing lens 6-5 is made to have the width of 1 mm, it is necessary to make the length U1 (as shown in FIG. 8(b)) twice comparing to that of the prior art in order to improve easiness to see the light beam from the LED chip 12-2.

Further, though the LED lens inserted into the lens insertion hole 6-2 in the above described embodiment, is that for the separate type which includes the leading lens 6-4 and the diffusing lens 6-5, it does not matter that the LED lens is that for one body type which includes the leading lens and the diffusing lens.

According to the above described embodiment, in order to approach the LED chip 12-2 to the contact 10-6 on the print substrate 10-1, the leg portion 6-21 of the conductive contact rubber 6-3 has the open portion 6-6 in which the LED chip 12-2 is accommodated, and the leading lens 6-4 is supported on the edge of the open portion 66, and the leading lens 6-4 is pushed upwardly by the resiliency of the conductive contact rubber 6-3. Additionally, the conductive contact rubber 6-3 and the key case 6-1 are constructed so that the flange portion 6-23 of the leading lens 6-4 is hid below a lower end face of the key case 6-1, that is, the rear face of the groove 6-25 of the key case 6-1. As a consequence, it is possible to approach the LED chip 12-2 to the key button 11 and to shorten the width W1 of the key case 6-1.

When the user of the dealing board 1 is going to carry out a transmission with the customer, the user once pushes the key button 11 indicating the name of the customer and the telephone line is connected to the customer with a button-touch, emitting light from the LED chip 12-2. Thus, it is known that the telephone line is being used, however, when another customer or caller is calling on the same line, it is indicated by the LED chip. The colors of the cases of being called and calling are different from each other. According to the present invention, it is possible that one LED chip 12-2 emits three colors at most.

The conductive contact rubber 6-3 placed under the key button 11 corresponds to the contact 10-6 placed in the print substrate 10-1 and the contact rubber 6-3 is not covered by a case, as is the contact rubber of the conventional key switch. Consequently, it is possible to make the movable contact 6-26 of the conductive contact rubber 6-3 turn ON-OFF with the contact 10-6 on the print substrate 10-1.

As the key button 11 has a skirt portion 11-3, it prevents dust and the like from coming into the print substrate 10-1 when the key button 11 is pushed.

It is not necessary, according to the present invention, to secure various parts mounted on the print substrate 10-1 by soldering them after the terminal 165-4 is inserted through a hole formed in the print substrate as in the prior art. Using the surface mountable parts on the print substrate 10-1, it is possible to attain a high density mounting of various parts or elements mounted on the print substrate 10-1. In particular, the conventional LED protective resistor 12-1 is replaced by a chip element resistor 6-7 and the chip element is inserted between the under face of the key case 6-1 and the print substrate 10-1 and secured there, thereby it is possible to shorten a pitch $X_1$ between the key buttons 11 and to shorten the width W1 of the key case 6-1.

Furthermore, according to the present invention, the width of the frame 9-8 between openings 9-1, through which the key unit 6 formed in the panel 9 is accommodated, is narrowed exceedingly from 5 mm of the prior art to 2.8 mm, so that it is possible to lessen the pitches between the key units 6.

In order to enhance the operability or convenience of the key button 11 employed in the key unit 6, the depth of the key button 11 is made 10.7 mm, which is the same as that of the prior art.

Because both the LED chip 12-2 and the LED lenses 6-5 and 6-4 are placed near the key button 11, it is a concern that emission from the LED chip is hard to see because of hindrance of the front face of the key button 11. This is solved by making a step difference $Y_1$ between the front face of the key button 11 and the top face of the LED lens 6-5 less than the step difference $Y_2$ of the prior art and making a slope of the slanted edge 11-2 of a circumference of the top face of the key button 11 less than the slope of the conventional structure.

As described above, according to the embodiment above, it is possible to shorten the pitch size of the key buttons 11 from $X_2=28$ mm of the prior art to $X_1=18$ mm.

Figure 11:
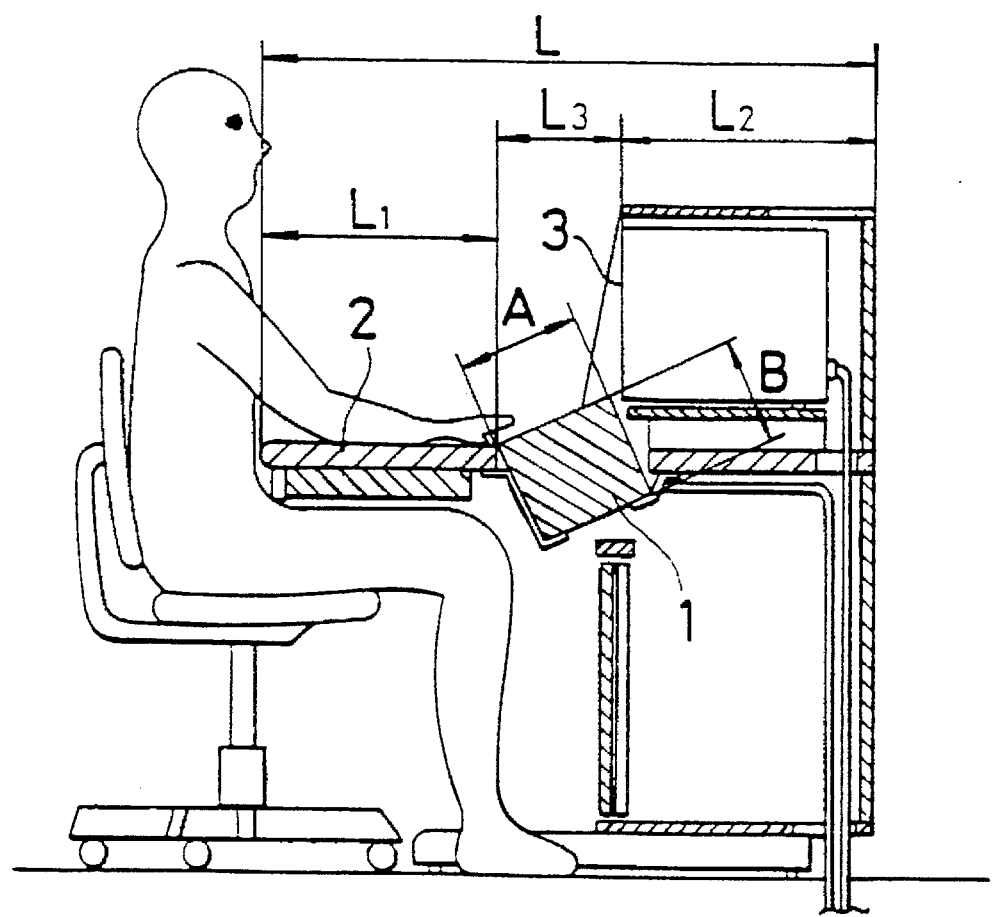
FIG. 11 is a section showing a usage condition of the panel unit.

As a consequence, as shown in FIG. 11, it is possible to lessen the space or depth, occupied by the dealing board 1. Therefore, it is possible to lessen the depth L of the whole structure of the dealing desk without changing a depth $L_1$ of a work space and a depth $L_2$ of the space in which a CRT or the like is installed.

The panel 9 is manufactured by a sheet metal process according to the embodiment, but it is possible to manufacture it by a mold process. The key case 6-1 of the key unit 6, the dial button 5-1 of the dial control portion 5, and the key button 11 are formed by a mold process.

In addition, the key unit 6 may have two sliding portions of the key button and may be constructed to accommodate a long button having a size about twice of the length of the key button 11. Such a long button is used, for example, to reserve the telephone line, or for transfer and off-operation of the telephone, which are functions used repeatedly. Because the key button is long, an operability thereof will be improved. These long key buttons can be applied to panel units of other electronic appliances.

According to the first invention, the key unit 6 is provided with a first print substrate 10-1 on which a contact 10-6 and a LED chip 12-2 capable to be mounted on a flat surface are mounted, a conductive contact rubber 6-3, placed on the first print substrate 10-1, having a movable contact portion 6-26 which can contact with the contact 10-6 and an open portion 6-6 in which the LED chip 12-2 is accommodated, a key button 11 placed on the conductive contact rubber 6-3, a LED lens (6-4, 6-5), placed on the edge portion of the open portion 6-6 of the conductive contact rubber 6-3, which leads the light beam generated from the LED chip 12-2 in the open portion 6-6, and a key case 6-1 having a through hole 6-9 into which the key button 11 is slidably inserted and a lens insertion hole 6-2 into which the LED lens (6-4, 6-5) is inserted.

As a consequence, as the LED lens (6-4, 6-5) is placed on the conductive contact rubber 6-3, it is possible to prevent the LED lens (6-4, 6-5) from rattling by means of the resiliency of the conductive contact rubber 6-3. Also, the LED chip 12-2 is accommodated in the open portion 6-6, so that it is possible for the light beam generated from the LED chip 12-2 to be prevented from breaking through. Also, the LED chip 12-2 and the contact 10-6 are mounted on a flat surface on the print substrate 10-1, so that there is no terminal protruding from the rear face of the print substrate 10-1, resulting in a possibility of high density or compact mounting of elements on the print substrate 10-1.

According to an aspect of the invention described below, the key unit 6 is provided with a chip resistor 6-7 to protect the LED chip 12-2, which is mounted on the first print substrate 10-1 at a position below a lower end face of the key case 6-1. As a consequence, it is possible to diminish the gap distance X1 between respective key cases 6-1 of the key unit 6 and the arrangement pitch of the key unit 6, and to lessen the depth or width of the panel unit 4 miniaturizing the whole construction of the dealing board.

Due to a miniaturization of the dealing board, it is possible to make the dealing desk smaller and to use more effectively the limited floor space of the dealing room.

According to another aspect of the invention described in a sectional shape (as shown in FIG. 9) on the line between a position where the key button 11 is inserted into the through hole 6-9 and a position where the LED lens (6-4, 6-5) is inserted into the lens insertion hole 6-2, the width V1 of the LED lens (6-4, 6-5) is made to be shorter than the width T1 of the LED chip 12-2. As a consequence, it is possible to diminish the width W1 of the key case 6-1 between the button area (the top face of the key button 11) and the lens area (the top face of the LED lens 6-5), as seen from the outside appearance of the key unit 6.

According to still another aspect of the invention described below, the key unit 6 is further provided with a second print substrate 10-2 electrically connected to the first print substrate 10-1 through connectors (13-1, 13-2), a flat-pack integrated circuit part 10-5 mounted on the first print substrate 10-1 on an opposite face of the first print substrate 10-1 on which the contact 10-6 and the LED chip 12-2 are mounted, which has the function for integrating a number of the matrix information from the LED chip 12-2 and the switching mechanism which includes the contact 10-6 and the movable contact portion 6-26, and a second integrated circuit part mounted on the second print substrate 10-2, which has the function for controlling the flat-pack integrated circuit part 10-5.

As a consequence, it is possible to ensure the mounting area of the switching mechanism and the LED chip 12-2 on the first print substrate 10-1, carry out a high density or compact parts mounting on the print substrate (10-1, 10-2) and reduce some print substrates and connectors, hereby miniaturizing the panel unit 4 and curtailing the manufacturing cost.

According to another aspect of the invention described below, the lens insertion hole 6-2 is provided with a fitting portion 6-20 at the opening position of the lens insertion hole 6-2, the LED lens (6-5) is provided with the receiving portion 6-22, and the fitting portion 6-20 is contacted with the receiving portion 6-22 when the LED lens (6-4, 6-5) is inserted into the lens insertion hole 6-2. As a consequence, it is possible to prevent the LED lens (6-4, 6-5) from coming out of the lens insertion hole 6-2.

According to still another aspect of the invention described below, while the LED lens (6-5, 6-5) is placed on the conductive contact rubber 6-3, the conductive contact rubber 6-3 pushes upwardly the LED lens (6-4, 6-5), and so the fitting portion 6-20 is pressed with the receiving portion 6-22. As a consequence, it is possible to prevent the LED lens (6-4, 6-5) from coming out of the lens insertion hole 6-2 by means of the resiliency of the conductive contact rubber 6-3.

According to another aspect of the invention described below, the LED lens 6-4 has a flange portion 6-23 on the bottom face of the LED lens 6-4, the LED lens 6-4 is placed on the conductive contact rubber 6-3 so as to hide the flange portion 6-23 below a lower end face 6-24 of the key case 6-1. As a consequence, it is possible to diminish the width W1 of the key case 6-1.

According to still another aspect of the invention described below, the LED lens (6-4), 6-5) is the separate type which makes the front portion to be a diffusing lens 6-5, and the rear portion to be a leading lens 6-4. As a consequence, the leading lens 6-4 transfers effectively upward the light beam generated from the LED chip 12-2 to the diffusing lens 6-5, so that the diffusing lens 6-5 diffuses upwardly the light beam through the leading lens 6-4, resulting in enlarging the area of the light beam.

According to another aspect of the invention described below, the LED lens (6-4, 6-5) is a one body type which makes the front portion to be a diffusing lens, and the rear portion to be a leading lens. As a consequence, as well as the effect of the eighth invention described above, it is possible to reduce parts in relation with the LED lens.

Another embodiment of the fixing structure securing a panel unit to the opening or open portion of the dealing board main body is shown in FIGS. 12–18.

Figure 12:
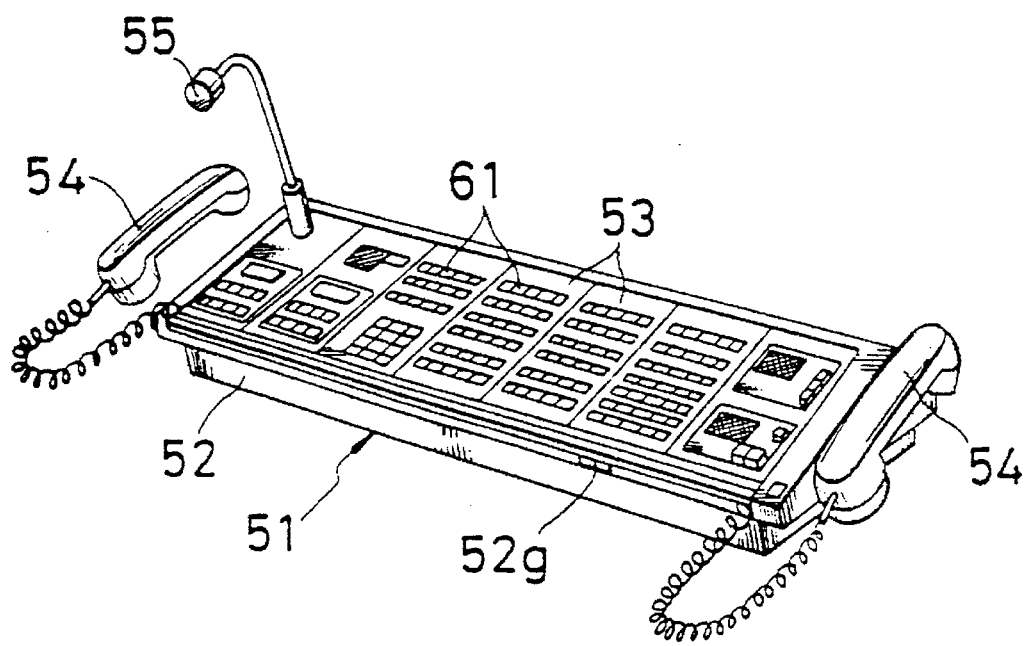
FIG. 12 is a perspective view of the main body of the dealing board to which another embodiment relates.
Figure 13:
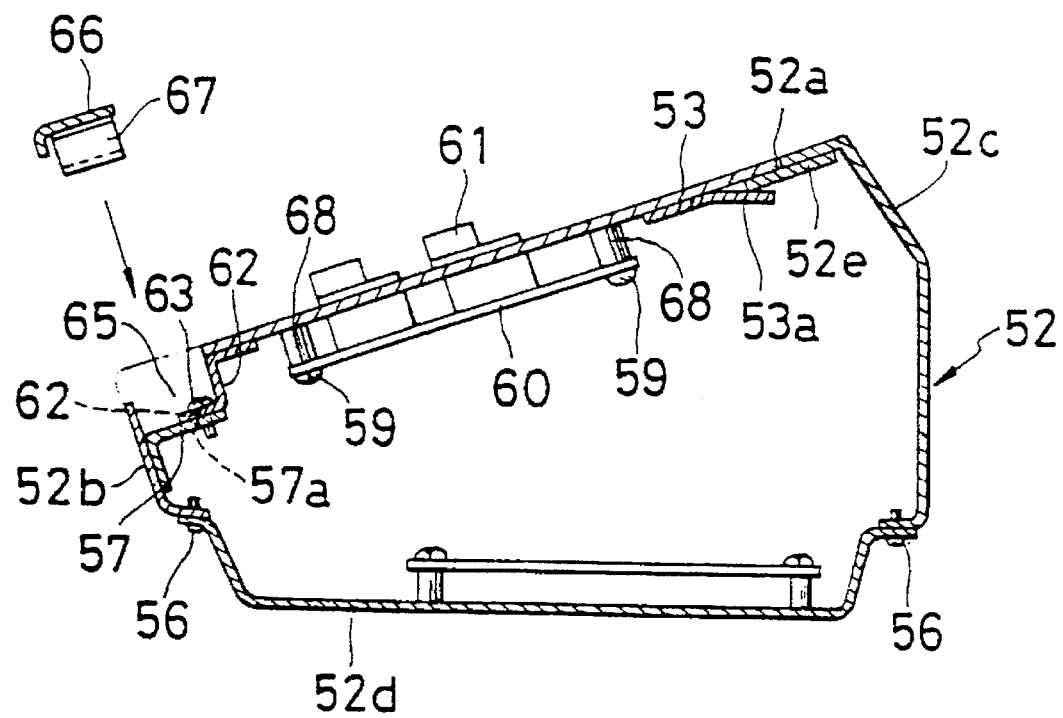
FIG. 13 is a section of the main body in its assembled condition.
Figure 14:
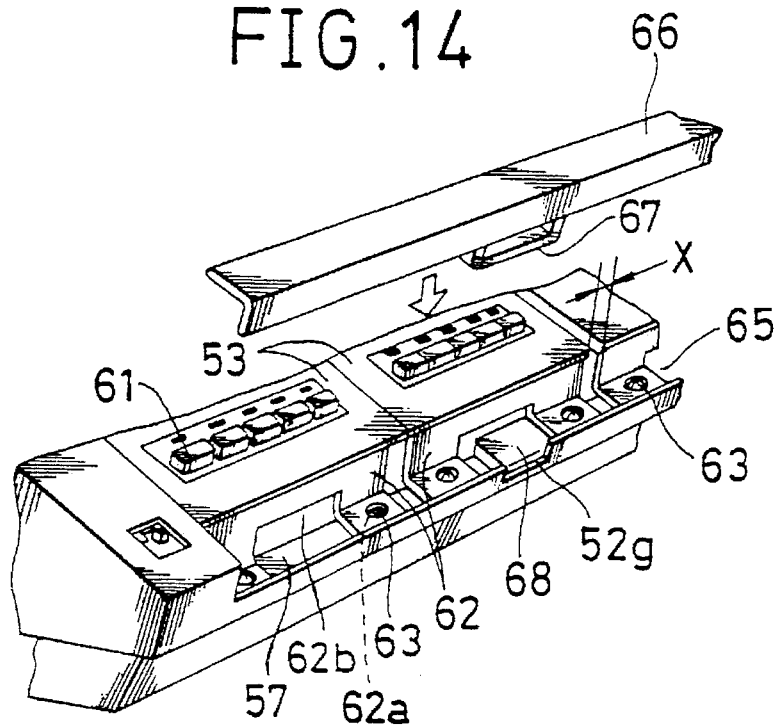
FIG. 14 is an explanation view of operation of the dealing board.
Figure 15:
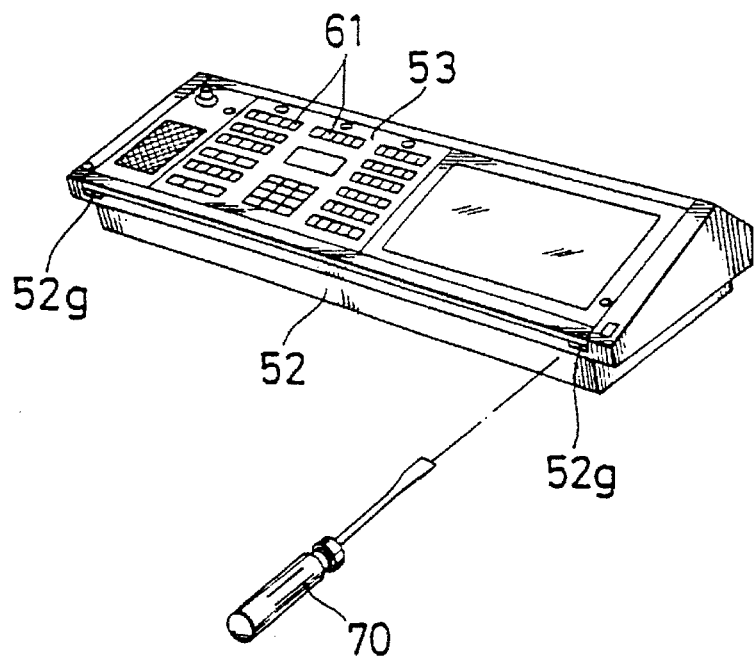
FIG. 15 is also an explanation view of operation of the dealing board.

FIG. 12 shows a whole view of the dealing board having multi-telephone functions, FIG. 13 is a section depicting an assembled case, and FIGS. 14 and 15 are operation explanation views of a disassembling process of the case.

The main body 51 of the dealing board has a case 52 provided with an open top face and a plurality of panels 53 are detachably secured to the opening 52a of the case 52.

In FIG. 12, 54 shows a hand set of the telephone set and 55 is a microphone.

The case 52 of the dealing board main body 51 has a rear wall 52c higher than its front wall 52b so as to slant forward the top face of the case.

A bottom plate 52d is detachably secured to the bottom portion by a small screw 56. A fixing piece 52e is firmly secured to the open edge of the rear side of the opening 52a at the top face of the case 52, and a receiving member 57 of a substantially L shape section is secured to the front open edge by welding or the like.

The top portions of the multi-function buttons 61 mounted on the print substrate 60, which are secured to a rear face of the panel 53 through a small screw or bis 59 and a spacer 68, protrude through top surfaces of the plural panels 53 which are installed from above to the opening 52a of the case 52. A fixing piece 53a engages from below with the fixing piece 52e at the side of the case 52 and is secured to the rear edge portion of each panel 53.

A securing member 62, formed by bending in a shape substantially of a crank, is secured through its one side to the rear face of the front edge side of the panel 53 by means of welding or the like. The other side of the securing member 62 is adapted to be mounted on the receiving member 57 at the side of the case 52 as shown in FIG. 14 when the panel 53 fits into the opening 52a from above, so that there is a bis hole 62a there. It is possible to secure the panel 53 to the case 52 by threadingly inserting the bis or small screw 63 inserted through the bis hole 62a formed in the securing member 62.

62b shown in the FIG. 14 is a cut-out formed in the securing member 62. By securing the securing member 62 installed on the panel 53 to the receiving member 57 at the side of the case 52 by means of the small screw 63, it is possible to form a dent 65 extending fully across the width of the case 52 between the front edge of the panel 53 and the upper edge of the front wall 52b of the case 52. The cover 66 is adapted to be fitted from above into the upper opening of the dent 65.

As shown in FIG. 14, the cover 66 has a section of a shape of substantially L and a size sufficient to cover the opening of the dent 65. A sucking member 67 made of magnetic material is fixed to the lower face of the central portion of the cover 66. When the cover 66 fits into the opening of the dent 65 from above, the sucking member 67 is sucked by a magnet 68 fixed to the receiving member 57 at the side of the case 52, so it is possible to place the cover 66 on the case 52.

52g in FIG. 14 means a cut-out through which a tool such as a screwdriver 70 is inserted when the cover 66 is intended to be removed (FIG. 15).

An operation of the dealing board will now be described. When the dealing board is used, a plurality of panels 53 are installed from above on the opening 52a of the case 52. When the panel 53 is moved or replaced by a new one in order to change its function, it is necessary to insert the tool 70 into the cut-out 52g formed at the front face of the case 52 as shown in FIG. 15 and remove the cover 66, exposing a dent 65 at the front side of the case 52, as seen in FIG. 13. Then the small screw 63 fixing the panel 53 is unfastened to change its position or exchange with a new panel.

After the position-changing or replacing of the panel 53, a gap between panels 53 is adjusted so as to make the gaps X between panels 53 equal and the securing member 62 is secured to the receiving member 57 by a small screw 63.

These workings above can be done from above the case 52, so it is not necessary to turn over the case 52, which turning-over has been done conventionally.

After a completion of the assembling of each panel 53, the cover 66 fits into the opening of the dent 65 to close the opening.

Figure 16:
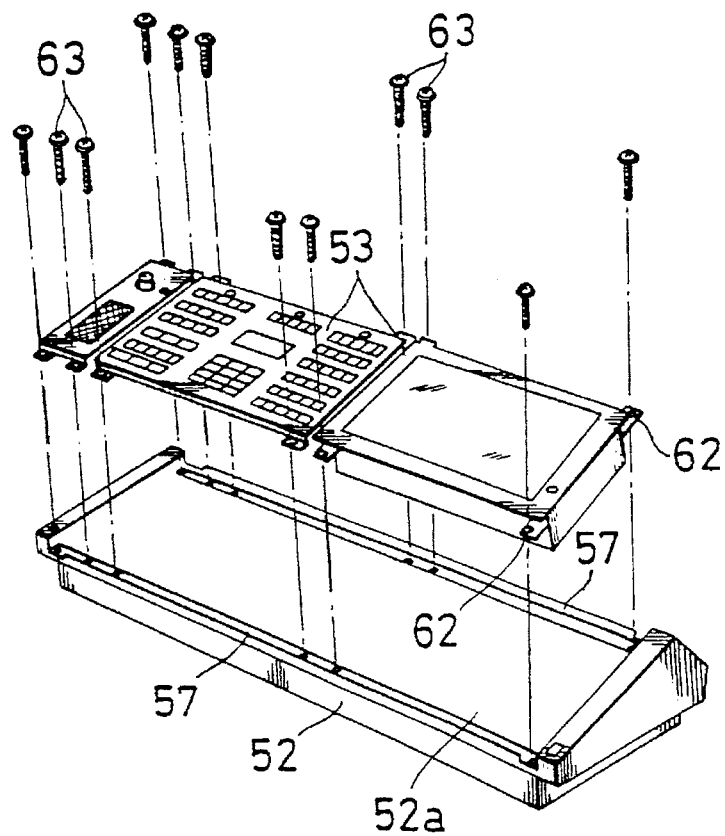
FIG. 16 is an exploded perspective view of another embodiment of the main body of the dealing board.
Figure 17:
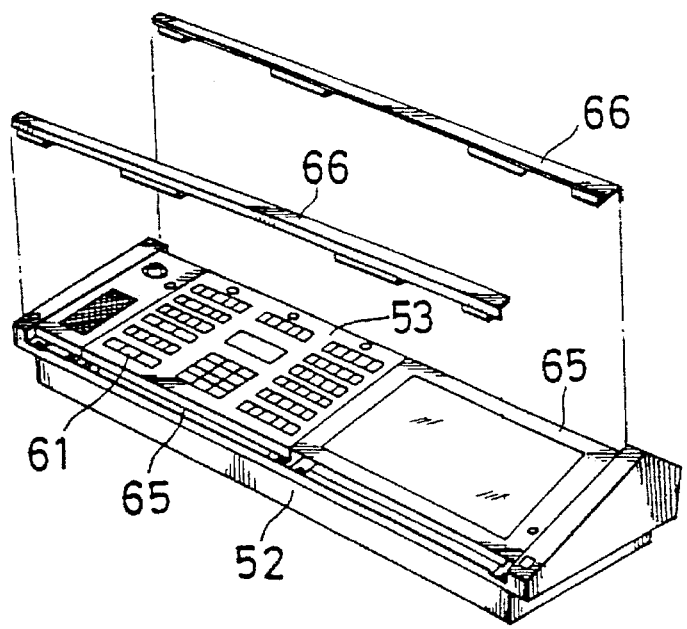
FIG. 17 is a perspective view of another embodiment of the dealing board main body.

According to the embodiment above of the present invention, though the dent 65 is formed at the front side of the case 52, it is possible alternately to form dents 65 at the front and the rear sides of the case 52, whereby front and rear portions of the panel 53 are fixed to the case 52 through the small screws 63 as shown in FIG. 16, and covers 66 fit into the front and rear dents 65 as shown in FIG. 17.

FIG. 18 shows still another embodiment in which an opening 65a of the dent 65 extends fully across substantially the width of the top face of the case 52 and an elastic member 71 is fitted to the opening 65a so as to make a top portion of the elastic member 71 protrude above the top face of the panel 53.

According to the embodiment, when the elastic member 71 is taken off from the opening 65a of the dent 65, the small screw 63 is exposed, so that it is possible to fix and remove the panel 53 from above the case 52 similar to the previous embodiment. Furthermore, when the dealing board is used, the top portion of the elastic member 71 protrudes above the panel 53, so that a writing instrument 72 placed carelessly on the panel 53 is stopped by a protrusion 71a of the top portion of the elastic member 71, preventing the writing instrument 72 from dropping.

The prevention function above can also be attained by forming a protrusion on the cover 66.

According to respective embodiments, the case 52 and the panel 53 are manufactured by a metal plate forming process, however, they can be formed by molding resin and the like, in which case it is possible to form the fixing pieces 52e and 53a, receiving member 57, and securing member 62 integrally with the case 52 and panel 53.

It is also possible to use both-face sticking tape, latches and the like as a securing means for fixing the cover 66 to the case 52.

As described above, the embodiment provides a dealing board having multiple telephoning functions which are unitized and respective units are panelized, and a plurality of panels are installed therein. In the dealing board above, a dent having an open top face opening between respective panels installed so as to be slanted forward is formed on the top face of the case and the panel is adapted to be secured to the case from above through the opening of the dent by means of a screw, consequently it is not necessary to turn over the case in order to secure the panel as in the prior art, so that the detaching work of the panels can be done without difficulty, as well as the gap between panels can be adjusted from above the case, thereby improving its workability.

In the dealing board of the above described embodiment, the opening of the dent is adapted to be closed by a removable cover, so that no fastening means such as screws for the panel are needed and no means is exposed, resulting in an improvement of appearance.

In the dealing board of the above described embodiment, a sucking member made of magnetic material is installed on the cover, which sucking member is adapted to be sucked to the magnet on the case, resulting in easy removal of the cover.

In the dealing board of the above described embodiment, the cover is made of an elastic member and so removal of the cover is easy.

In the dealing board of the above described embodiment, the cover has a protrusion protruding above the top face of the panel, and even though a writing instrument is carelessly placed on the panel, the protrusion prevents the instrument from falling down and solves any hindrance on work.

Next, another embodiment of the fixing structure of the panel unit will be described in detail with reference to FIGS. 19–22.

FIG. 19 is a perspective view of a single dealing board and FIG. 20 is a section of the dealing board.

The dealing board shown in FIG. 19 has a main body 81 installed on the desk so as to be slanted on its front side and a plurality of panel units 82 are arranged transversely in a row on the opening 81a opening in the top face of the dealing board main body 81. At both sides of the dealing board main body 81, there are hand-sets 83 and 84 for calling and receiving calls through two-wire lines. At the left side thereof, there are a microphone 85 and a speaker 86 enabling one to call and receive calls without using hand-sets 83 and 84.

The panel unit 82 having united telephoning functions, a dial button 90 for calling the clients, a liquid crystal display portion 91 for displaying messages and the like, and one-push buttons 92 for enabling one to call the customer instantly are panel-united per each function.

The front edge 81b of the opening 81a open in the top face of the dealing board main body 81 is substantially at a right angle to a front face plate 81c of the dealing board main body 81. A receiving device 81d shaped in substantially a reversed L is secured to the inside of the front edge 81b so as to leave a gap $X_3$ between the front edge 81b and the lower face, and an engagement piece 82a protruding from the panel unit 82 is adapted to be inserted into the gap $X_3$ between the receiving device 81d and the front edge 81b.

As described above, a plurality of kinds of the panel units 82 per each function are prepared previously. The panel unit 82 having an auto-dial function enabling one to call the particular customer instantly or by one-push operation has the following structure.

Figure 22:
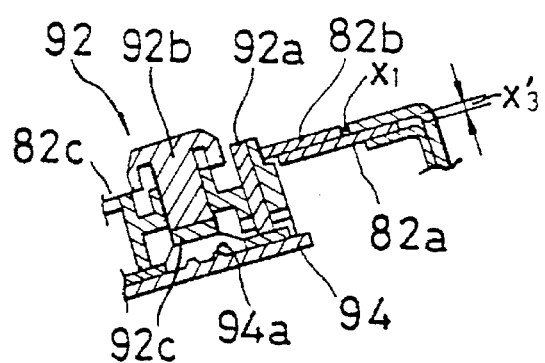
FIG. 22 is an enlarged exploded view of the portion VII in FIG. 20.

As shown in FIG. 22, a case 92a of the one touch button 92 is accommodated in the opening 82c open in the panel 82b of the panel unit 82 and a button 92b is installed slidably up-and-down within the case 92a. Below the button 92b, a conductive contact rubber 92c and the print substrate 94 are placed with a gap between them. The conductive contact rubber 92c is adapted to contact the contact 94a on the print substrate 94 generating an ON signal when the button 92b is pushed.

The print substrate 94 as shown in FIG. 20 is secured to a rear face of the panel 82b through a spacer 95 and a set-screw 96 and another print substrate 97 is secured below the print substrate 94 through the spacer 95 and the set-screw 96. Electronic part 98 for obtaining one-touch dialing function is secured to the print substrate 97 and a connector 99 joins print substrates 94 and 97 to one another.

An engagement piece 82a is protrudingly formed at the front end and the rear end of the panel 82b of the panel unit 82 mentioned above and the engagement piece 82a at the front end is engaged with the opening 81a at the side of the front edge 81b.

The engagement piece 82a at the rear end side is adapted to be secured to the dealing board main body 81 by means of a fixing device 100 formed at a rear edge of the opening 81a of the dealing board main body 81.

Figure 21:
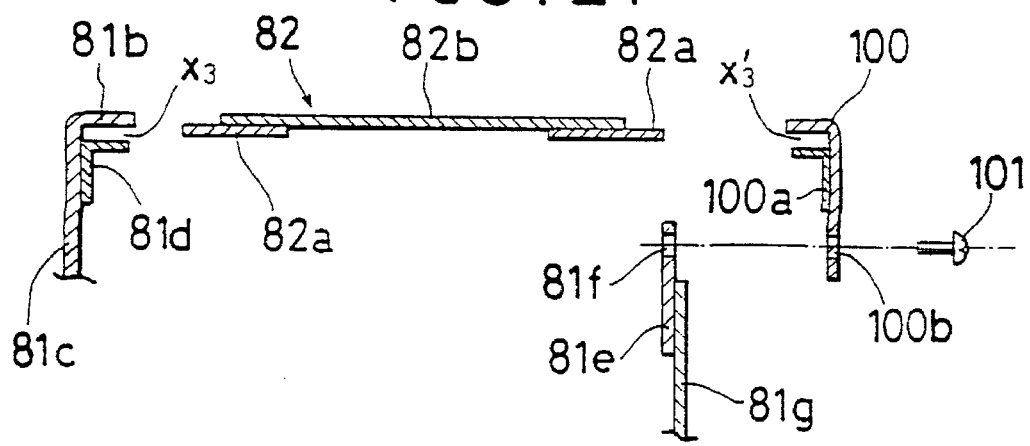
FIG. 21 is an enlarged exploded view of the portion VI in FIG. 20.

As shown in FIG. 21, the fixing device 100 has a substantially reversed L-shape and another fixing device 100a of a reversed L-shape smaller than the former is secured within an interior of the former with a gap $X_3'$.

A size of the gap $X_3'$ is sufficient to make the engagement piece 82a inserted therethrough, similar to the previous gap $X_3$. A front end of the receiving device 100a is adapted to not protrude from a front end of the fixing device 100.

The fixing device 100 has a thread hole 100b formed therein through which hole 100b a set-screw 101 is inserted, which set-screw is adapted to be threadingly inserted through a screen plate or partition plate 81e secured to a rear face plate 81g of the dealing board main body 81.

The screen plate 81e is secured to the inside of an upper edge portion of the rear face plate 81g by means such as welding as shown in FIG. 21. A screw hole 81f through which the set-screw 101 is inserted is formed at a top end side of the screen plate 81e.

An operation of the dealing board will now be described. Fixing a panel unit 82 to the dealing board main body 81, a position of the panel unit 82 is first determined, then the panel unit 82 is fixed to the opening 81a of the main body 81.

When fixing is carried out, the engagement piece 82a at the front end side of the panel unit 82 is inserted through the gap $X_3$ formed between the front edge 81b of the opening 81a and the receiving device 81d, then another engagement piece 82a at a rear end side is inserted through another gap $X_3'$ between the fixing device 100 and the receiving device 100a, a set-screw 101 is inserted through a screw hole 100b of the fixing device 100 and is threadedly inserted through a screw hole 81f of a screen plate 81e, tentatively holding the panel unit 82.

It is possible to secure or fix the panel unit 82 at a place near the front face side or on the front face side of the dealing board main body 81 at that time, thereby improving the workability.

After a completion of tentative securing of all the panel units 82, the gap $X_1$ between the dealing board main body 81 and each panel unit 82 and another gap $X_2$ (not shown) between respective panel units 82 are adjusted so as to equalize them to each other, and then set-screws 101 are finally fastened in order to settle all panel units 82 relative to the dealing board main body 81. Consequently it is not necessary to turn around or reverse the dealing board main body 81, as in the prior art, when the panel units 82 are secured to the main body. 81.

According to the embodiment above, the fixing device 100 is placed at the side of the rear face plate 81g of the main body 81 of the dealing board, however, it is apparent that it may be installed at the side of the front face plate 81c.

Explicitly the fixing device 100 is made of metal sheet, so its surface is preferably painted.

Consequently, considering a thickness of the paint, the gaps $X_3$, $X_3'$ through which engagement piece 82a is inserted are determined as shown below.

According to the embodiment, the thickness of the engagement piece 82a is 1.6 mm. When the gaps $X_3$, $X_3'$ are 1.8 mm and the engagement piece 82a is inserted through the gaps $X_3$, $X_3'$, the paint will be peeled off.

When the gaps are fixed to 2.2 mm, the engagement piece 82a enters without difficulty, however the piece 82a will be given a play. This is not preferable. As a result, the gaps $X_3$, $X_3$ are made to be 2.0 mm. The engagement piece 82a is then insertable through the gaps $X_3$, $X_3'$ without peeling off of paint.

The resultant data of experiments above is shown in the following Table-1.

TABLE 1

| Item | Sizes of $X_3$, $X_3'$ | | |
|---|---|---|---|
| | 1.8 | 2.0 | 2.2 |
| Insertion | difficult | good | easy |
| Peeling off | seen | none | none |
| Play of panel unit | none | none | played |
| Total judgment | X | O | Δ |

The data above is obtained when the fixing device 100 is manufactured by metal sheet. When the fixing device 100 is manufactured by synthetic resin, no problem of paint peeling occurs.

The manufacturing process may be applied to electric appliances and machines other than the dealing board with a similar result.

According to the above described embodiment, one of the engagement pieces protruded from both ends of the panel unit is engaged with an end of the opening of the dealing board main body and another engagement piece is secured to the dealing board main body by a fixing device on the front surface or near the front surface of the main body, so that it is possible to secure panel units without reversing the dealing board main body, as well as to adjust the gaps between respective panel units while seeing the surface of the dealing board main body. As a result, it is possible to exceedingly improve the workability of securing the panel units to the main body of the dealing board, in comparison with the conventional dealing board.

Because it is possible to secure the panel units while watching the arrangement of them, panel units are effectively secured for short times. Also, rearrangement, checking and repairing of the panel units can be done at the front surface of the main body of the dealing board, resulting in ease of exchanging and maintenance of the panel units.

Next, a construction of the cover covering the card insertion slot of the dealing board will be explained.

Figure 23:
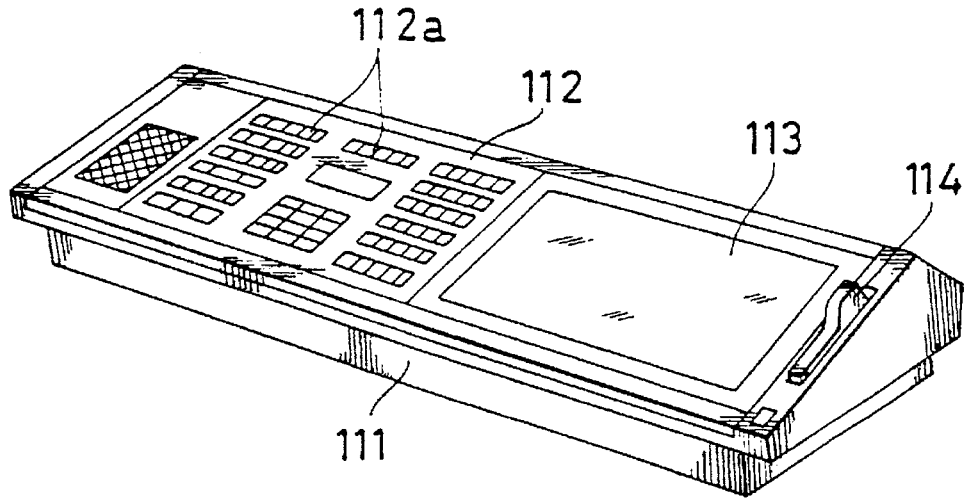
FIG. 23 is a perspective view of the dealing board main body to which another embodiment relates.

FIG. 23 shows a perspective view of the dealing board provided with a control panel 112 placed on the top face of a main body 111 of the dealing board shown, a plasma display 113, a reader-writer (not shown), and a card insertion slot 116. The control panel 112 has a number of buttons 112a, and the card insertion slot 116 is adapted to be covered with a cover 114 and through which a memory card 115 is inserted.

Figure 27:
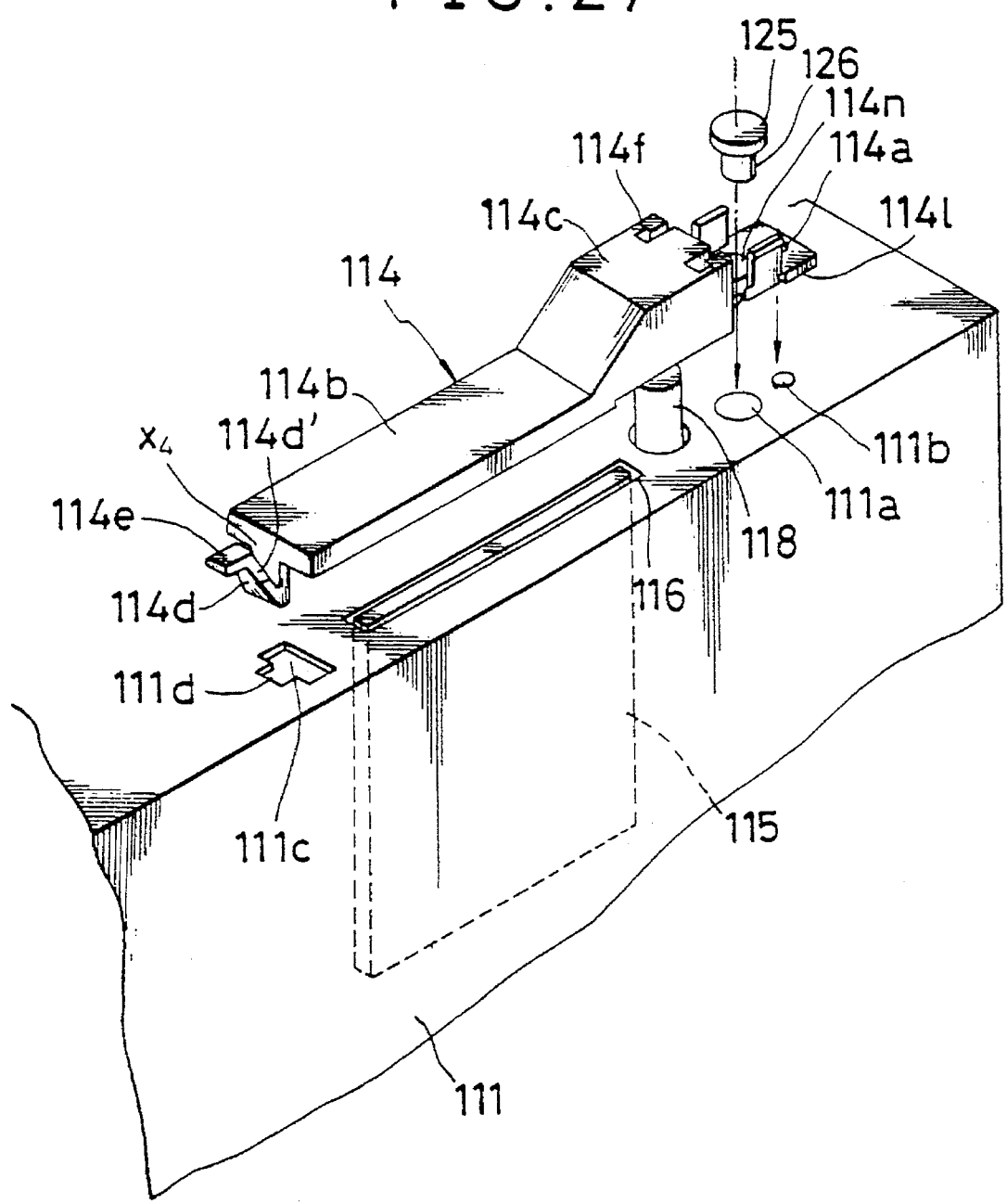
FIG. 27 is an exploded perspective view showing the process of cover fixing.
Figure 28:
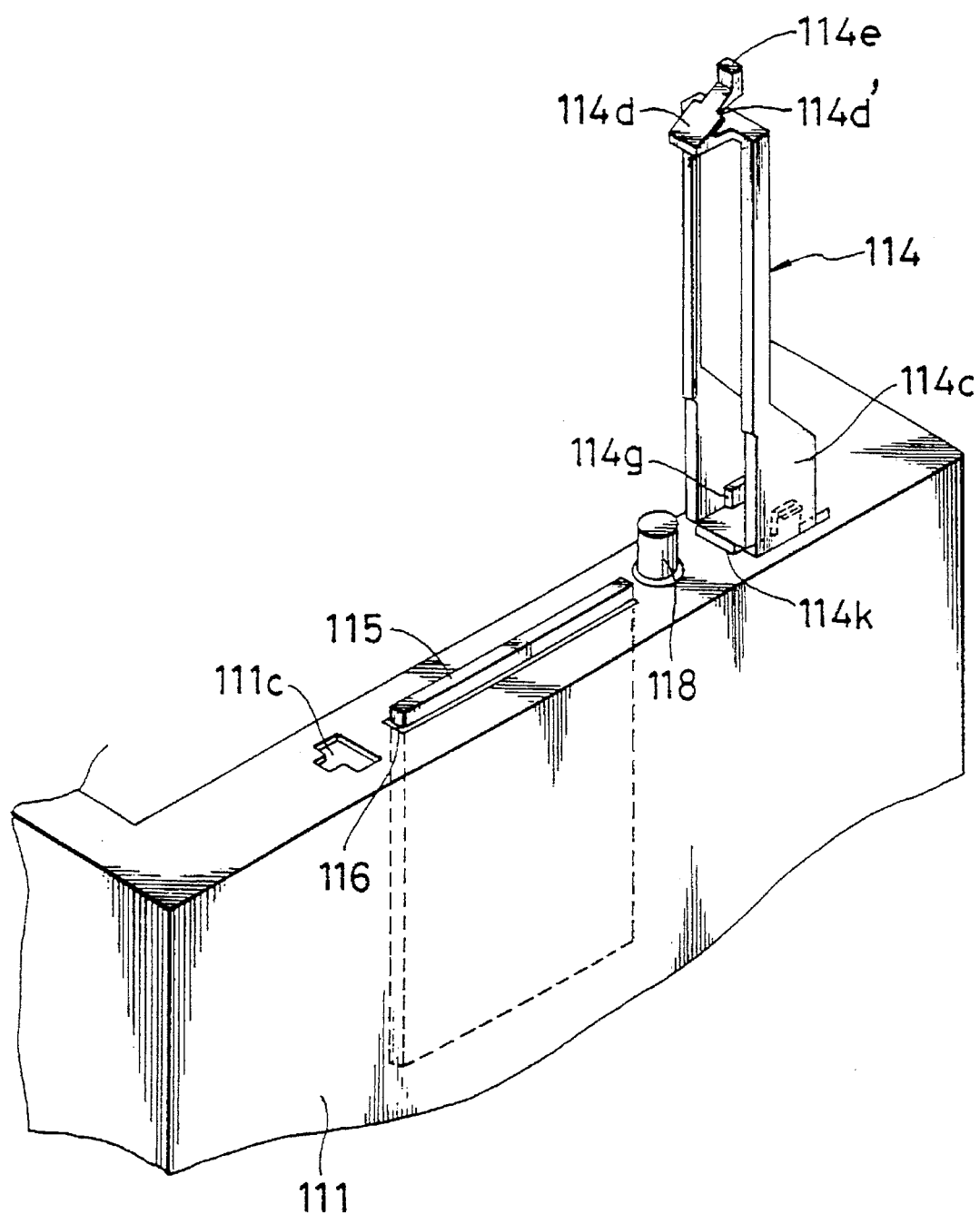
FIG. 28 is a perspective view of the dealing board main body having the cover open.
Figure 29:
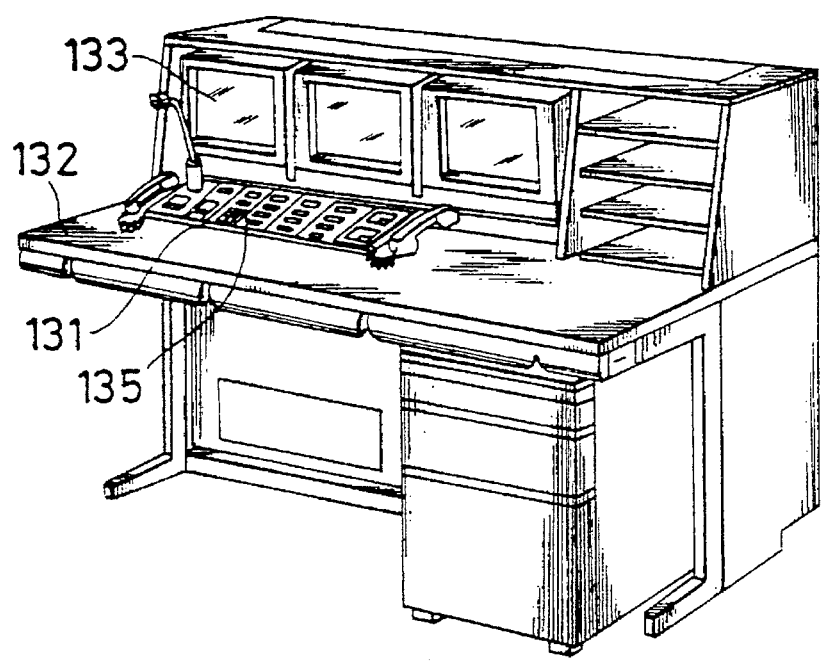
FIG. 29 is a perspective view of the whole construction of the conventional dealing board.
Figure 30:
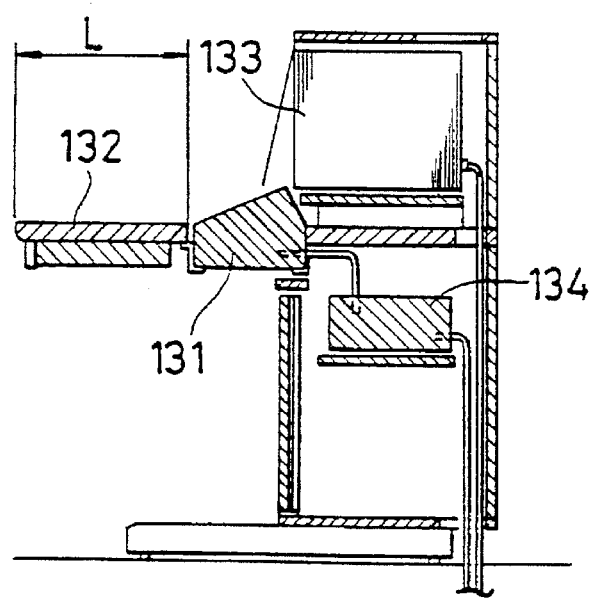
FIG. 30 is a section of the whole dealing board.
Figure 31:
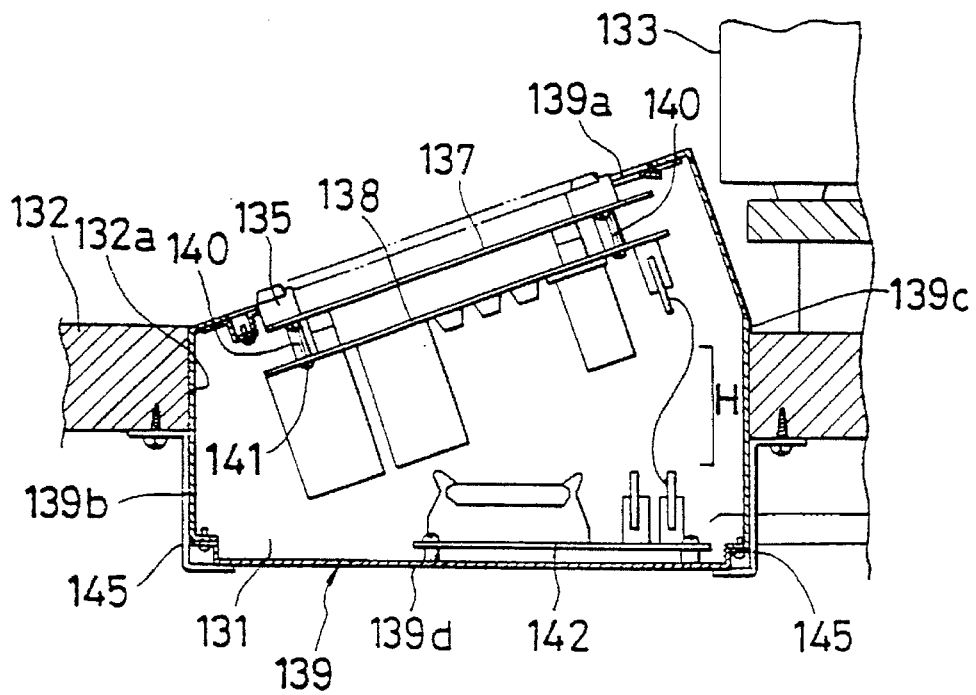
FIG. 31 is a section of the main body of the dealing board above.
Figure 32:
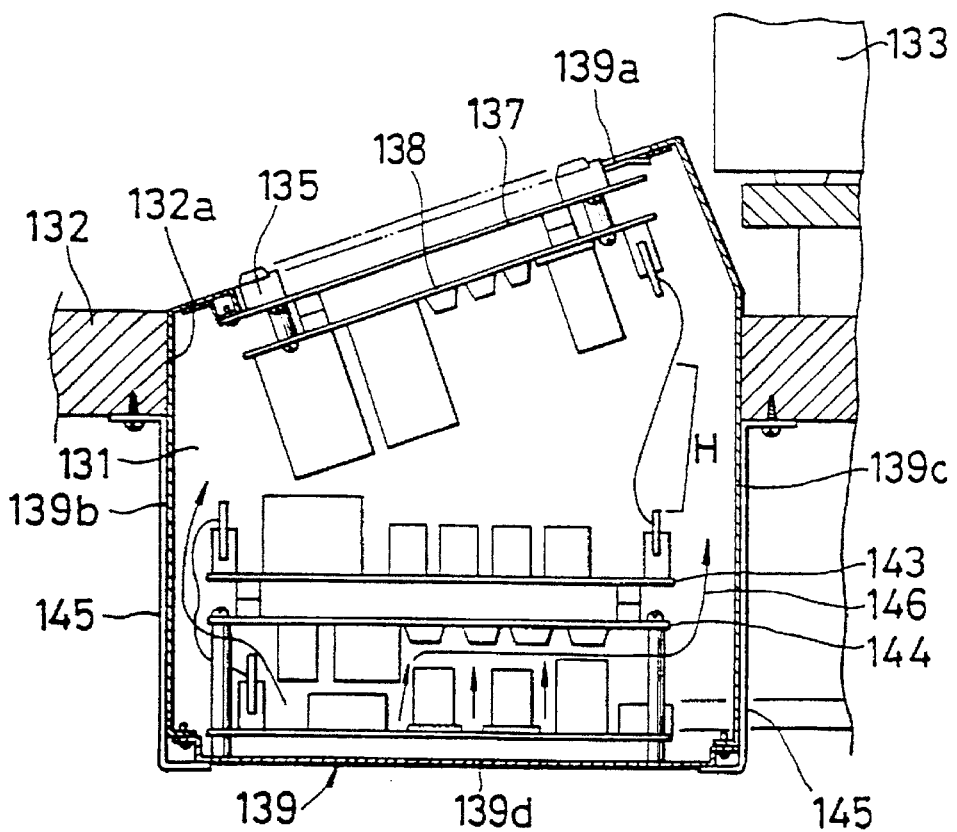
FIG. 32 is a section of the main body of the dealing board main body.
Figure 33:
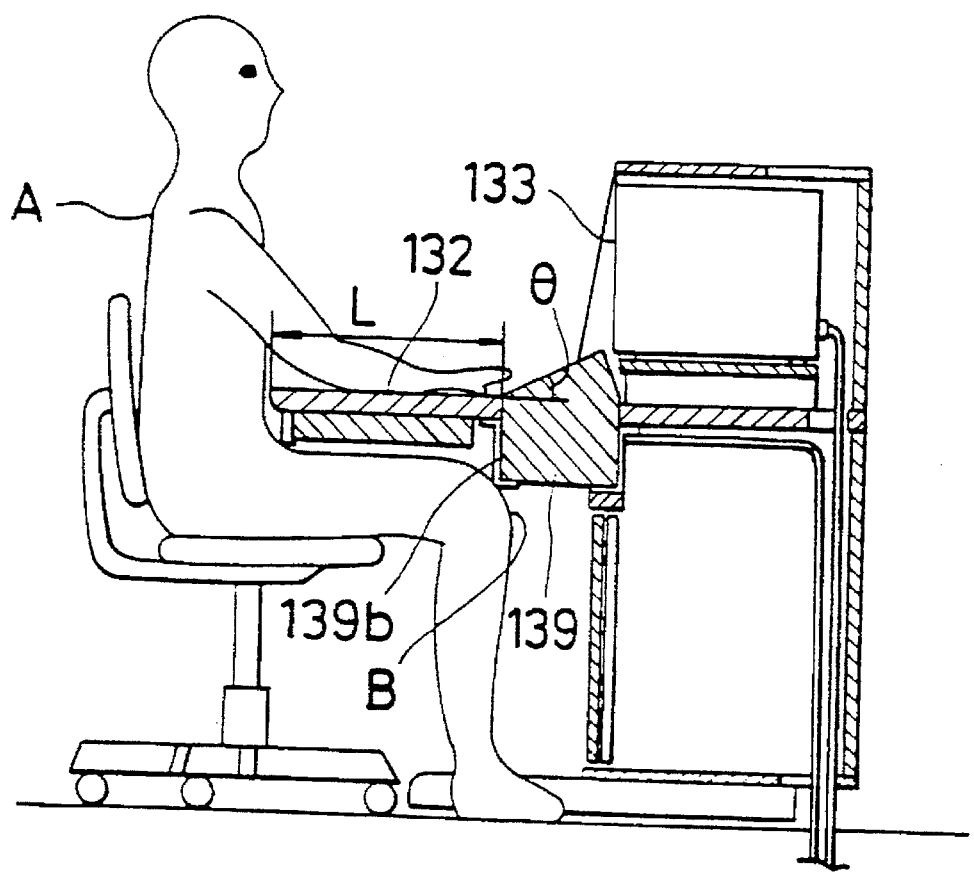
FIG. 33 is an explanation view of the dealing board main body at its usage condition.
Figure 34:
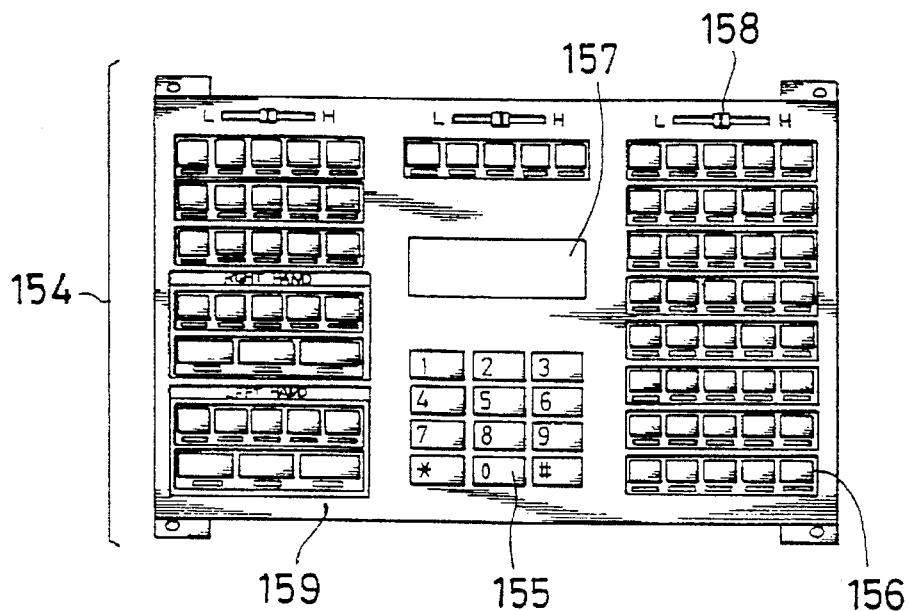
FIG. 34 is a plan view of a panel unit on the main body of the dealing board.
Figure 35:
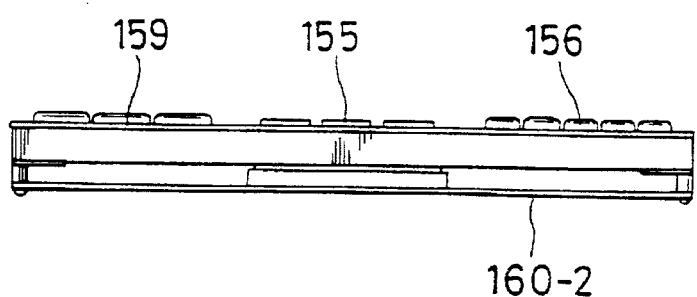
FIG. 35 is a front view of the panel unit.
Figure 36:
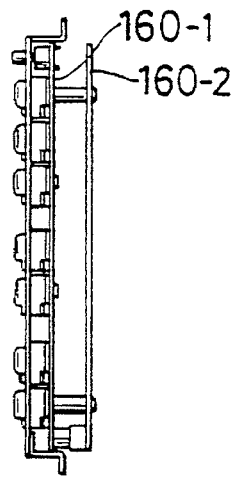
FIG. 36 is a side elevation of the panel unit.
Figure 37:
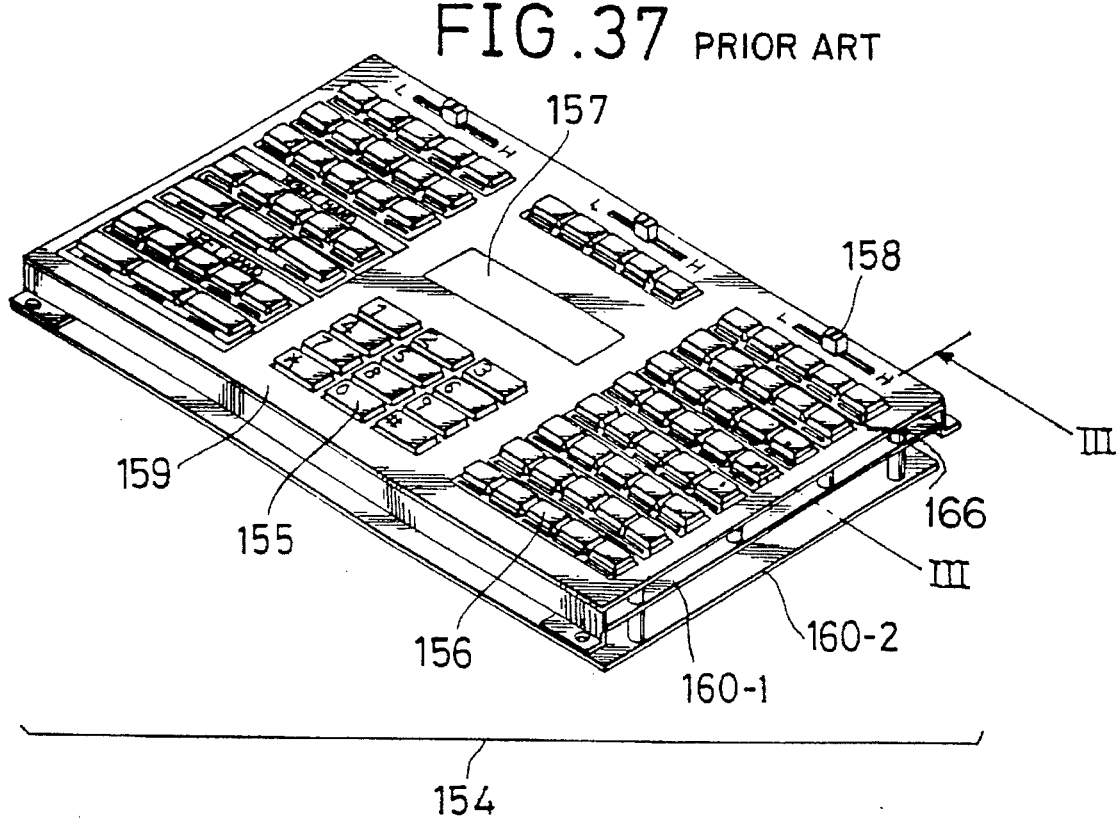
FIG. 37 is a perspective view of the panel unit.
Figure 38:
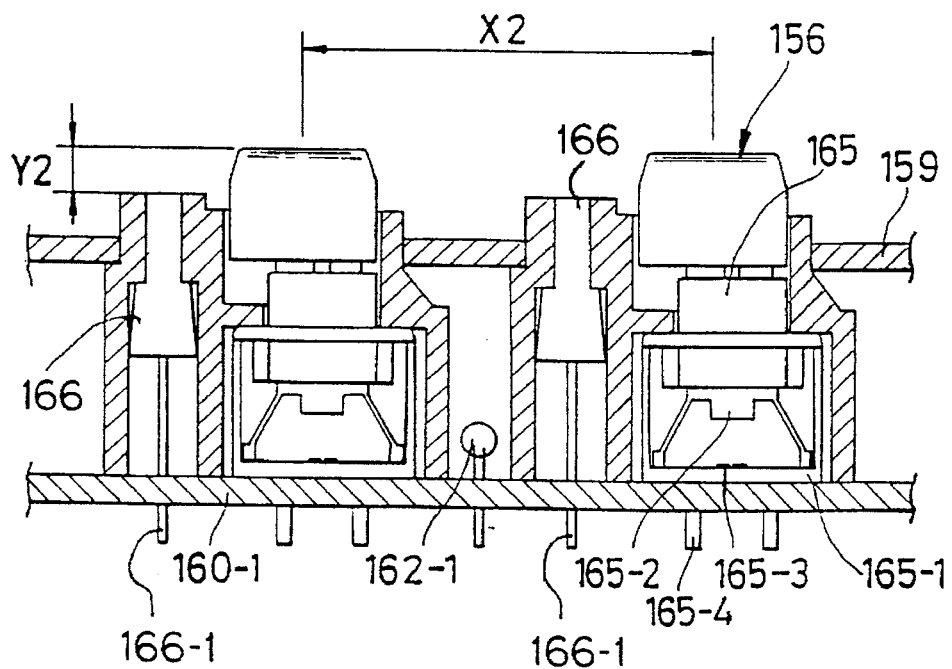
FIG. 38 is a section on the line III—III in FIG. 37, depicting a portion of the key unit of the panel unit.
Figure 39:
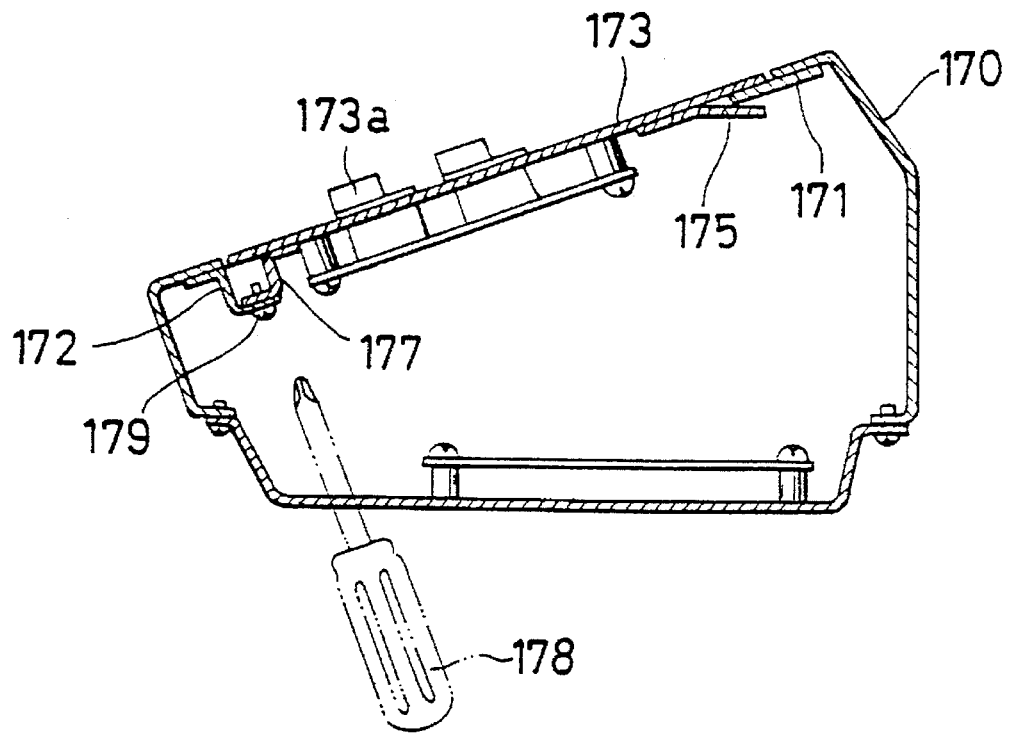
FIG. 39 is a section of the main body of the dealing board.
Figure 40:
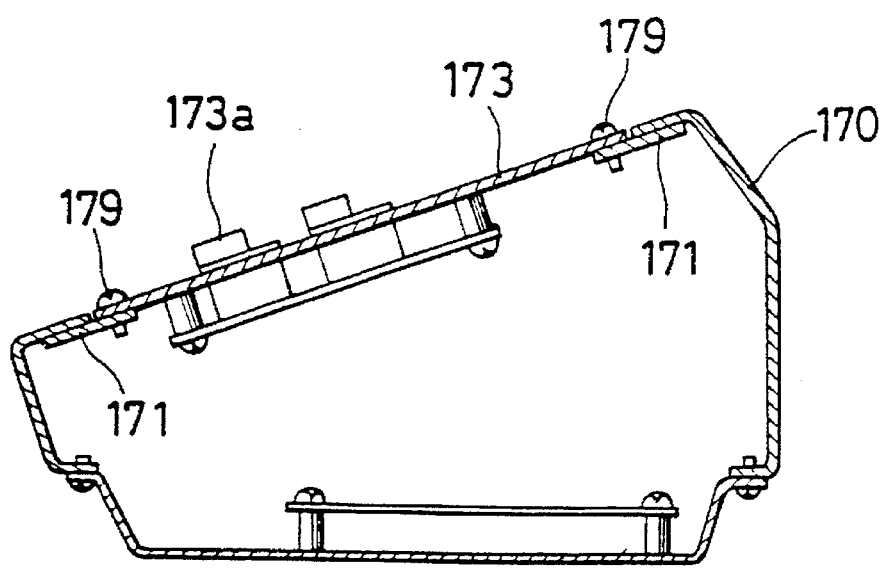
FIG. 40 is a section of the main body of another dealing board.
Figure 41:
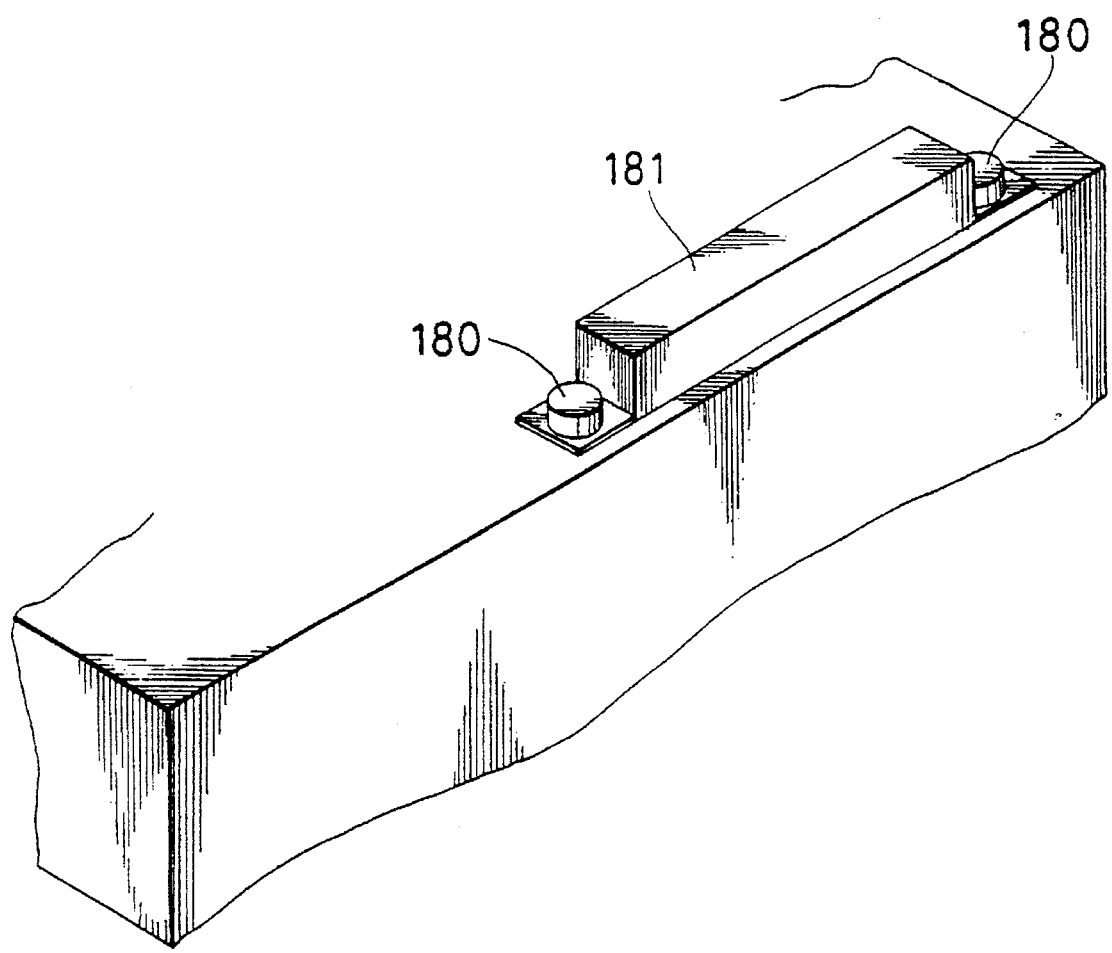
FIG. 41 is a perspective view of the cover on the main body of the conventional dealing board.

As shown in FIG. 27, the card insertion slot 116 has an ellipse opening and a protrusion button 118 for taking out the card is placed by one end of the card insertion slot 116. There are a fixing hole 111a and a small hole 111b adjacent to the button 118, through the former a fastening device 125 such as a rivet for fastening one end portion of the cover 114 is inserted and through the latter a projection 114a for preventing the cover 114 from rotating is inserted.

Adjacent to the other end of the card insertion slot 116, an engagement hole 111c of a raised-type shape in plane is formed, and the hole 111c has an engagement portion 111d.

Figure 24:
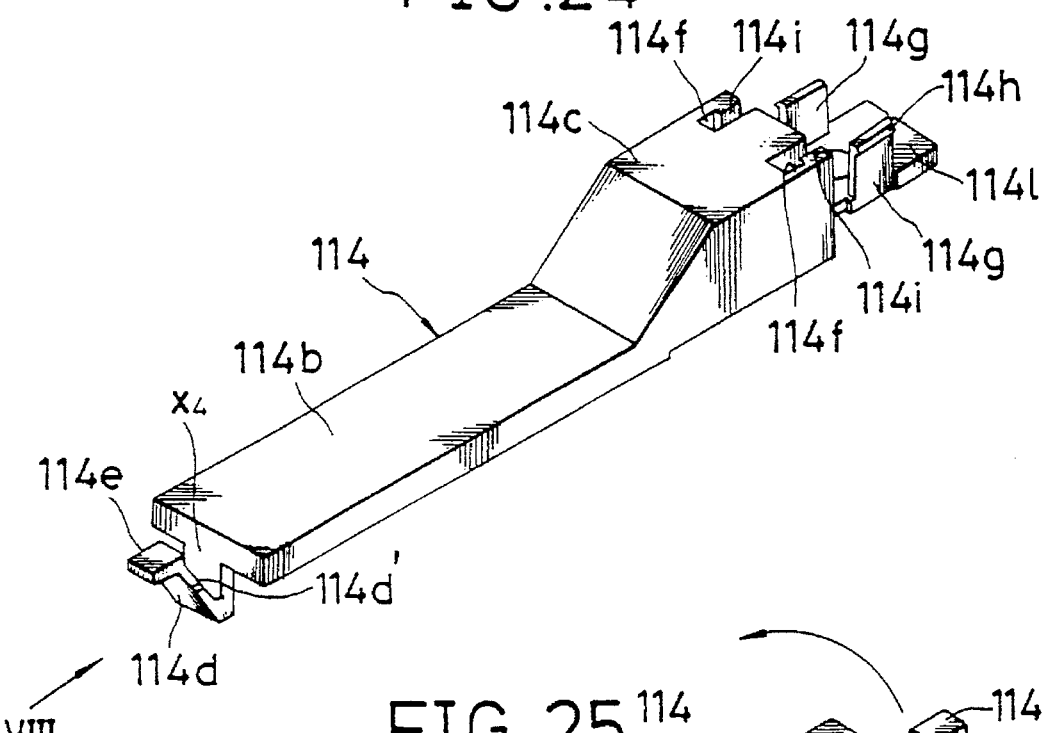
FIG. 24 is a perspective view of the cover of the main body of the dealing board.
Figure 25:
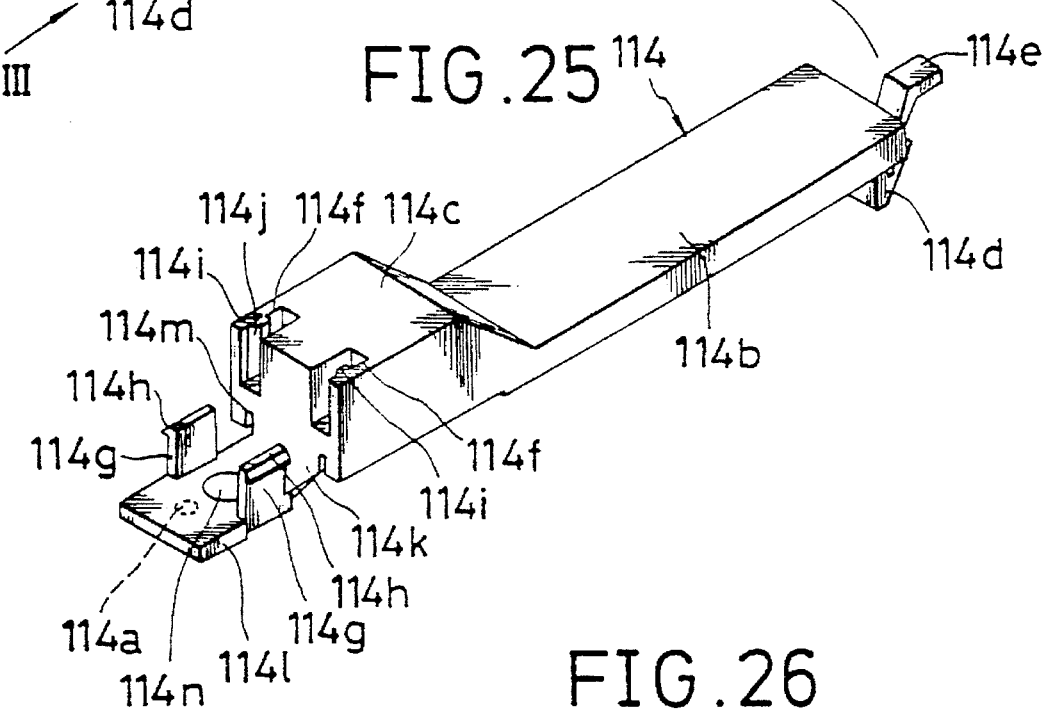
FIG. 25 is a perspective view of the cover of the main body of the same dealing board.
Figure 26:
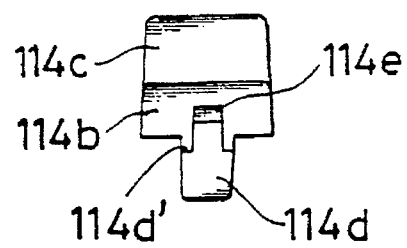
FIG. 26 is a front view seen along the direction VIII shown in FIG. 24.

It is noted that the cover 114 is integrally formed by synthetic resin and the like, and it includes generally a flat portion 114b covering the card insertion slot 116 and a raised button cover portion 114c covering the card taking-out button 118 as shown in FIGS. 24–26.

An elastic engagement claw 114d of an elastic engagement portion having a substantial V-shape in side view is integrally formed at an end portion of the flat plate portion 114b.

The elastic engagement claw 114d has a narrow engagement portion 114d' and a knob 114e for taking off the narrow engagement portion 114d' which are adapted to be engageable with an engagement portion 111d of the engagement hole 111c.

The button covering portion 114c has an open bottom. When the button covering portion 114c covers the slot 116, the card taking-off button 118 protrudes through the open bottom and is accommodated in the button covering portion 114c. Two slits 114f extending along an up-and-down direction are formed with a separation gap in a width direction between them at the end face of the button covering portion 114c.

On the interior face of the slits 114f, there are two ridges 114i extending in the axial direction, with which ridges the engagement portion 114h of an engagement piece 114g described below engages.

On end faces of the ridges 114i at its side through which the engagement piece 114g enters, there is a slanted face 114j adapted to make an entering of the engagement portion 114h of the engagement piece 114g easy. As a result, the engagement piece 114g is kept at its insertion condition through the slit 114f and the engagement portion 114h of the engagement piece 114g is engaged with the ridge 114i, so as to keep the cover 114 in an erected position.

A fixing portion 114l of a tongue-shape is integrally formed below the end face side of the button covering portion 114c.

In order to make a hinge portion 114k elastically deformable, it has a cut-out 114m formed on the end face of the button cover portion 114c so as to sandwich the hinge portion 114k, as well as the hinge portion 114k itself has a thickness, for example, about 0.3–0.5 mm thinner than that of the fixing portion 114l.

The fixing portion 114l has a fixing hole 114n formed at a position corresponding to that of another fixing hole 111a open at the side of the main body 111 of the dealing board, and a protrusion 114a placed at a position corresponding to a small hole 111b so as to prevent the cover 114 from rotating.

The cover 114 is placed by the following process. As shown in FIG. 27, the fastening device or rivet 125 is inserted through the fixing hole 111a of the dealing board main body 111 and another fixing hole 114n formed in the fixing portion 114l, and then the fastening device 126 is caulked. In the fastening process, the projection 114a formed on the bottom face of the fixing portion 114l fits the small hole 111b at the side of the dealing board main body 111, thus the cover 114 is prevented from rotating around a fulcrum of the fastening device 125.

An operation of the dealing board will now be described. When the dealing board main body 111 is not used, the elastic engagement claw 114d of the cover 114 is pressed in the engagement hole 111c at the side of the dealing board main body 111, the gap $X_4$ at the front end side of the elastic engagement claw 114d is made small or narrow, then it elastically widens, thereby the engagement portion 114d' of the elastic claw 114d is engaged with the engagement portion 111d of the engagement hole 111c. It is apparent from the above that the front end side of the cover 114 is engaged with the dealing board main body 111, preventing the card taking out button 118 from erroneously or carelessly being touched and foreign matter such as dust and the like from entering into the card insertion slot 116.

When the dealing board main body 111 is used, the knob 114e at a front end of the elastic engagement claw 114d is pushed so as to make the gap $X_4$ at its front end narrow, taking off the engagement portion 111d from another engagement portion 114d.

When the cover 114 is raised upward about a right angle around the hinge portion 114k, the front ends of the engagement piece 114g protruded along both side directions of the fixing portion 114l enter in the slits 114f through the end face of the button cover portion 114c, the engagement portion 114h formed protrudingly at front ends of the engagement piece 114g rides over the ridges 114i formed on the inner walls of the slits 114f. As a result, the cover 114 is held in an erect position because the engagement portion 114h engages with the ridges 114i.

The memory card 115 is inserted through the card insertion slot 116 and the cover 114 is closed, so the card taking-out button 118 is covered by the cover 114, resulting in a prevention of the card taking-out button 118 from erroneously being touched during a usage of the dealing board.

According to the embodiment above, the cover 114 is formed in a shape of flat plate in part in order to miniaturize the cover 114, however it is possible to make the cover 114 in the shape of a square box of a size large enough to cover the card insertion slot 116 and the card taking-out button 118.

In order to make it possible to recognize that the memory card 115 is inserted or not in the card insertion slot 116 when the cover is closed, the cover 114 may be made of transparent or semi-transparent material.

As described in detail above, according to the above described embodiment, as for a construction of the cover for covering the card insertion slot of the reader-writer for reading and writing information stored in the memory card, and covering the card taking-out button placed adjacent to the card insertion slot, the cover has, at its end, a fixing portion for installing the cover on the dealing board main body, a hinge portion for functioning as a fulcrum for opening and closing the cover, and a holding mechanism for holding the cover in its erected position after it is raised around the hinge portion. On the other hand, the cover has at its other end an elastic engagement portion adapted to engage removably with an engagement hole formed in the dealing board main body, thereby it is possible to prevent the card taking-out button from erroneously and carelessly being touched, and foreign matter such as dust and trash from entering and invading into the card insertion slot. As a consequence, it is possible to prevent the reader-writer from malfunctioning and being damaged due to foreign matter.

Because the cover can open around the hinge portion after merely taking-off the elastic engagement portion, it is much easier to open and close the cover as compared to the prior art cover which is opened by loosening screws. In addition, the cover is not detached from the dealing board main body, so there is no danger of missing the cover.

Additionally, because the open cover is held at its erected position substantially perpendicularly, the cover does not hinder the memory card being entered and taken out.

Although only several embodiments of the inventions have been disclosed and described, it is apparent that other embodiments and modifications of the inventions are possible without departing from the spirit of the inventions.

What is claimed is:

1. A key unit, comprising:
   a first print substrate having a contact portion;
   an LED chip being capable of generating a light beam, said LED chip being mounted on a contiguous side of the contact portion of the first print substrate;
   a conductive contact rubber, disposed on the first print substrate, having a movable contact portion, a leg portion and an open portion, the movable contact portion being made to contact with the contact portion of said first print substrate by moving the movable contact portion in an up-and-down direction, the leg portion supporting the movable contact portion, the open portion being a portion in which the LED chip is accommodated, the open portion being provided on the leg portion, the open portion including an edge portion, a height of the edge portion of the open portion being higher than a height of the LED chip;
   an LED lens, disposed on the edge portion of the open portion of the conductive contact rubber, the LED lens leading upwardly the light beam generated from the LED chip, the LED lens having a receiving portion;
   a key button disposed on the conductive contact rubber; and
   a key case having a through hole into which the key button is slidably inserted and a lens insertion hole into which the LED lens is inserted,
   wherein, when the key button is slidably inserted into the through hole, the movable contact portion of the conductive contact rubber moves in the up-and-down direction in accordance with movement of the key button in the up-and-down direction, so that the movable contact portion is contacted with the contact portion of the first print substrate, the lens insertion hole having a fitting portion at an opening of the lens insertion hole, the fitting portion being contacted with the receiving portion of the LED lens when the LED lens is inserted into the lens insertion hole, and
   wherein, when the LED lens is disposed on the edge portion of the conductive contact rubber and the LED lens is inserted into the lens insertion hole, the LED lens is pushed upwardly by means of a resiliency of the conductive contact rubber, so that the receiving portion of the LED lens is pressed against the fitting portion of the lens insertion hole.

2. The key unit according to claim 1,
   wherein the key unit is provided with a chip resistor to protect the LED chip, the key unit being mounted on the first print substrate at a position below a lower end face of the key case.

3. The key unit according to claim 1,
   wherein, in a sectional shape on a line between a position where the key button is inserted into the through hole and a position where the LED lens is inserted into the lens insertion hole, a width of the LED lens is made to be shorter than a width of the LED chip.

4. The key unit according to claim 2, wherein, in a sectional shape on a line between a position where the key button is inserted into the through hole and a position where the LED lens is inserted into the lens insertion hole, a width of the LED lens is made to be shorter than a width of the LED chip.

5. The key unit according to claim 1, wherein the key unit is further provided with a second print substrate electrically connected to the first print substrate through connectors, said key unit further comprising:
- a flat-pack integrated circuit part mounted on the first print substrate on an opposite face of the first print substrate on which the contact portion and the LED chip are mounted, the flat-pack integrated circuit part being capable of integrating a number corresponding to information received from the LED chip and being capable of performing a switching operation for the contact portion and the movable contact portion; and
- a second integrated circuit part mounted on the second print substrate and configured to control the flat-pack integrated circuit part.

6. The key unit according to claim 2, wherein the key unit is further provided with a second print substrate electrically connected to the first print substrate through connectors, said key unit further comprising:
- a flat-pack integrated circuit part mounted on the first print substrate on an opposite face of the first print substrate on which the contact portion and the LED chip are mounted, the flat-pack integrated circuit part being capable of integrating a number corresponding to information received from the LED chip and being capable of performing a switching operation for the contact portion and the movable contact portion; and
- a second integrated circuit part mounted on the second print substrate and configured to control the flat-pack integrated circuit part.

7. The key unit according to claim 3, wherein the key unit is further provided with a second print substrate electrically connected to the first print substrate through connectors, said key unit further comprising:
- a flat-pack integrated circuit part mounted on the first print substrate on an opposite face of the first print substrate on which the contact portion and the LED chip are mounted, the flat-pack integrated circuit part being capable of integrating a number corresponding to information received from the LED chip and being capable of performing a switching operation for the contact portion and the movable contact portion; and
- a second integrated circuit part mounted on the second print substrate and configured to control the flat-pack integrated circuit part.

8. The key unit according to claim 1, wherein the LED lens has a flange portion on a bottom face of the LED lens, the LED lens being placed on the conductive contact rubber so as to hide the flange portion below a lower end face of the key case.

9. The key unit according to claim 2, wherein the LED lens has a flange portion on a bottom face of the LED lens, the LED lens being placed on the conductive contact rubber so as to hide the flange portion below the lower end face of the key case.

10. The key unit according to claim 3, wherein the LED lens has a flange portion on a bottom face of the LED lens, the LED lens being placed on the conductive contact rubber so as to hide the flange portion below a lower end face of the key case.

11. The key unit according to claim 4, wherein the LED lens has a flange portion on a bottom face of the LED lens, the LED lens being placed on the conductive contact rubber so as to hide the flange portion below the lower end face of the key case.

12. The key unit according to claim 5, wherein the LED lens has a flange portion on a bottom face of the LED lens, the LED lens being placed on the conductive contact rubber so as to hide the flange portion below a lower end face of the key case.

13. The key unit according to claim 6, wherein the LED lens has a flange portion on a bottom face of the LED lens, the LED lens being placed on the conductive contact rubber so as to hide the flange portion below the lower end face of the key case.

14. The key unit according to claim 1, wherein the LED lens is of a separate body portion having a front portion and a rear portion in which the front portion is a diffusing lens and the rear portion is a leading lens.

15. The key unit according to claim 1, wherein the LED lens is a one body portion having a front portion and a rear portion in which the front portion is a diffusing lens and the rear portion is a leading lens.

* * * * *